US012652228B2

(12) United States Patent
Judge et al.

(10) Patent No.: US 12,652,228 B2
(45) Date of Patent: Jun. 9, 2026

(54) TRUSTED OR ATTESTED PACKET TIMESTAMPING

(71) Applicant: Amazon Technologies, Inc., Seattle, WA (US)

(72) Inventors: Alan Michael Judge, Dublin (IE); Said Bshara, Tira (IL); Julien Ridoux, Seattle, WA (US); Joshua Benjamin Levinson, Seattle, WA (US); David James Goodell, Seattle, WA (US); Erez Izenberg, Tel Aviv-Jaffa (IL); Anthony Nicholas Liguori, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 417 days.

(21) Appl. No.: 17/705,157

(22) Filed: Mar. 25, 2022

(65) Prior Publication Data

US 2023/0308378 A1     Sep. 28, 2023

(51) Int. Cl.
*H04L 43/106* (2022.01)
*G06F 1/04* (2006.01)
(Continued)

(52) U.S. Cl.
CPC ........ *H04L 43/106* (2013.01); *H04L 43/0852* (2013.01); *H04L 2212/00* (2013.01)

(58) Field of Classification Search
CPC .............. H04L 43/106; H04L 43/0852; H04L 2212/00; G06F 1/04; G06F 9/5072; H04J 3/0644; H04J 3/0697; H04J 3/0661
See application file for complete search history.

(56) References Cited

U.S. PATENT DOCUMENTS

| | | | |
|---|---|---|---|
| 6,223,286 | B1 | 4/2001 | Hashimoto |
| 8,654,790 | B2 | 2/2014 | Haver et al. |
(Continued)

FOREIGN PATENT DOCUMENTS

| | | | | |
|---|---|---|---|---|
| DE | 102017216047 A1 | * | 3/2019 | ........... H04L 63/123 |
| EP | 2592807 | | 7/2014 | |
(Continued)

OTHER PUBLICATIONS

Author: Ajay Ohri Title: "Tunneling Protocol—A Complete Overview" Year: 2021 (Year: 2021).*
(Continued)

*Primary Examiner* — Kamal M Hossain
(74) *Attorney, Agent, or Firm* — Alexander A. Knapp; Kowert, Hood, Munyon, Rankin & Goetzel, P.C.

(57)     ABSTRACT

Various embodiments of apparatuses and methods for trusted and/or attested packet timestamping are described. In some embodiments, the disclosed system and methods include a reference timekeeper providing a reference clock to host computing devices. The host computing devices host compute instances using a first set of computing resources, and also contain isolated timing hardware utilizing a different set of computing resources. The isolated timing hardware sets a hardware clock based on a signal corresponding to the reference clock from the reference timekeeper. The isolated timing hardware then receives a packet from a particular compute instance, creates a timestamp for the packet based at least in part on the hardware clock, where the timestamp is outside the control of the compute instances, and sends the packet and the timestamp through a data network to transmit to a packet destination.

20 Claims, 11 Drawing Sheets

(51) Int. Cl.
    *H04J 3/06*          (2006.01)
    *H04L 43/0852*     (2022.01)
    *G06F 9/50*          (2006.01)

(56)              References Cited

U.S. PATENT DOCUMENTS

| | | | |
|---|---|---|---|
| 8,701,209 | B2 | 4/2014 | Awata |
| 9,450,846 | B1 | 9/2016 | Huang et al. |
| 9,900,778 | B2 | 2/2018 | Chen et al. |
| 10,263,717 | B1 | 4/2019 | Suemitsu |
| 10,313,041 | B2 | 6/2019 | Butterworth et al. |
| 2004/0105549 | A1 | 6/2004 | Suzuki |
| 2005/0036512 | A1* | 2/2005 | Loukianov ....... H04N 21/23608 |
| | | | 375/E7.278 |
| 2007/0110074 | A1 | 5/2007 | Bradley et al. |
| 2010/0008376 | A1 | 1/2010 | Bandholz |
| 2013/0218549 | A1 | 8/2013 | Sultan et al. |
| 2016/0112182 | A1* | 4/2016 | Karnes ...................... G06F 1/14 |
| | | | 375/362 |
| 2018/0359811 | A1 | 12/2018 | Verzun |
| 2019/0044637 | A1* | 2/2019 | Gulstone ................. H04J 3/067 |
| 2019/0349392 | A1 | 11/2019 | Wetterwald |
| 2021/0021520 | A1 | 1/2021 | Wetterwald |
| 2021/0194612 | A1 | 6/2021 | Johnson |
| 2021/0392064 | A1 | 12/2021 | Suzuki |
| 2023/0006807 | A1* | 1/2023 | Hubbe ................ G06F 9/45558 |

FOREIGN PATENT DOCUMENTS

| | | |
|---|---|---|
| EP | 3654603 | 5/2020 |
| KR | 102476643 B1 | 12/2022 |
| WO | 2020151806 A1 | 7/2020 |

OTHER PUBLICATIONS

U.S. Appl. No. 17/806,231, filed Jun. 9, 2022, Bshara et al.
U.S. Appl. No. 17/643,785, filed Dec. 10, 2021, Julien Ridoux, et al.
U.S. Appl. No. 17/643,796, filed Dec. 10, 2021, Julien Ridoux, et al.
Adams, Carlisle, et al., Internet X. 509 public key infrastructure time-stamp protocol (TSP), RFC 3161, Aug. 2001, pp. 1-79.
International Search Report and Written Opinion mailed Jul. 7, 2023 in PCT/US2023/064210, Amazon Technologies, Inc., pp. 1-15.
IIEEE Standards Committee, "IEEE PI588, Draft IEEE 1588-2019, IEEE Standard for a Precision Clock Synchronization Protocol for Networked Measurement and Control System", ITU-T Draft; Study Period 2017-2020; Study Group 15, International Telecommunication Union, Aug. 26, 2020, pp. 1-500, Geneva, downloaded from the internet.

* cited by examiner

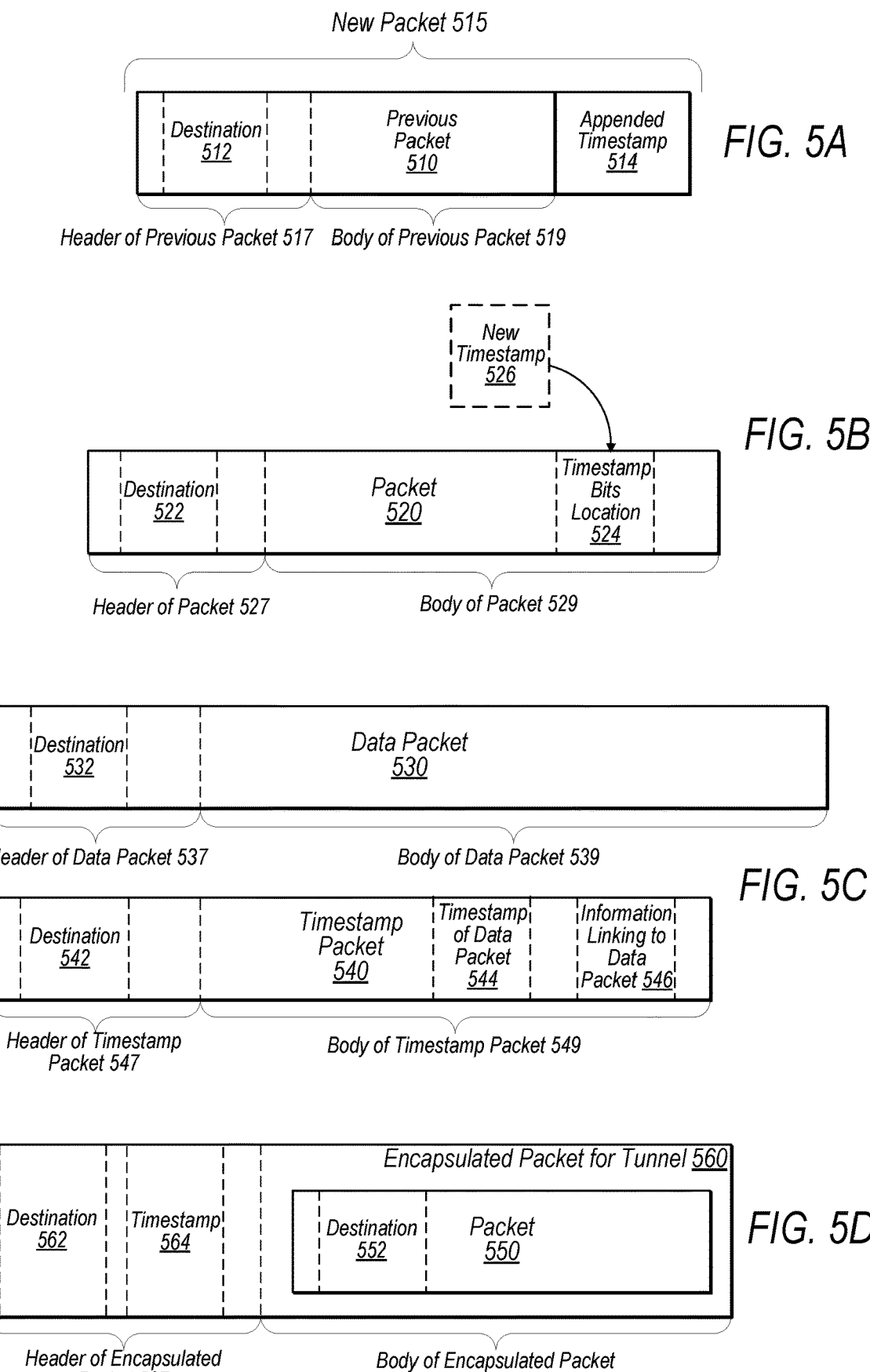

New Packet 515

| Destination 512 | Previous Packet 510 | Appended Timestamp 514 |

Header of Previous Packet 517    Body of Previous Packet 519

FIG. 5A

New Timestamp 526

| Destination 522 | Packet 520 | Timestamp Bits Location 524 |

Header of Packet 527    Body of Packet 529

FIG. 5B

| Destination 532 | Data Packet 530 |

Header of Data Packet 537    Body of Data Packet 539

FIG. 5C

| Destination 542 | Timestamp Packet 540 | Timestamp of Data Packet 544 | Information Linking to Data Packet 546 |

Header of Timestamp Packet 547    Body of Timestamp Packet 549

Encapsulated Packet for Tunnel 560

| Destination 562 | Timestamp 564 | Destination 552 | Packet 550 |

Header of Encapsulated Packet 567    Body of Encapsulated Packet 569

FIG. 5D

Figure 6:
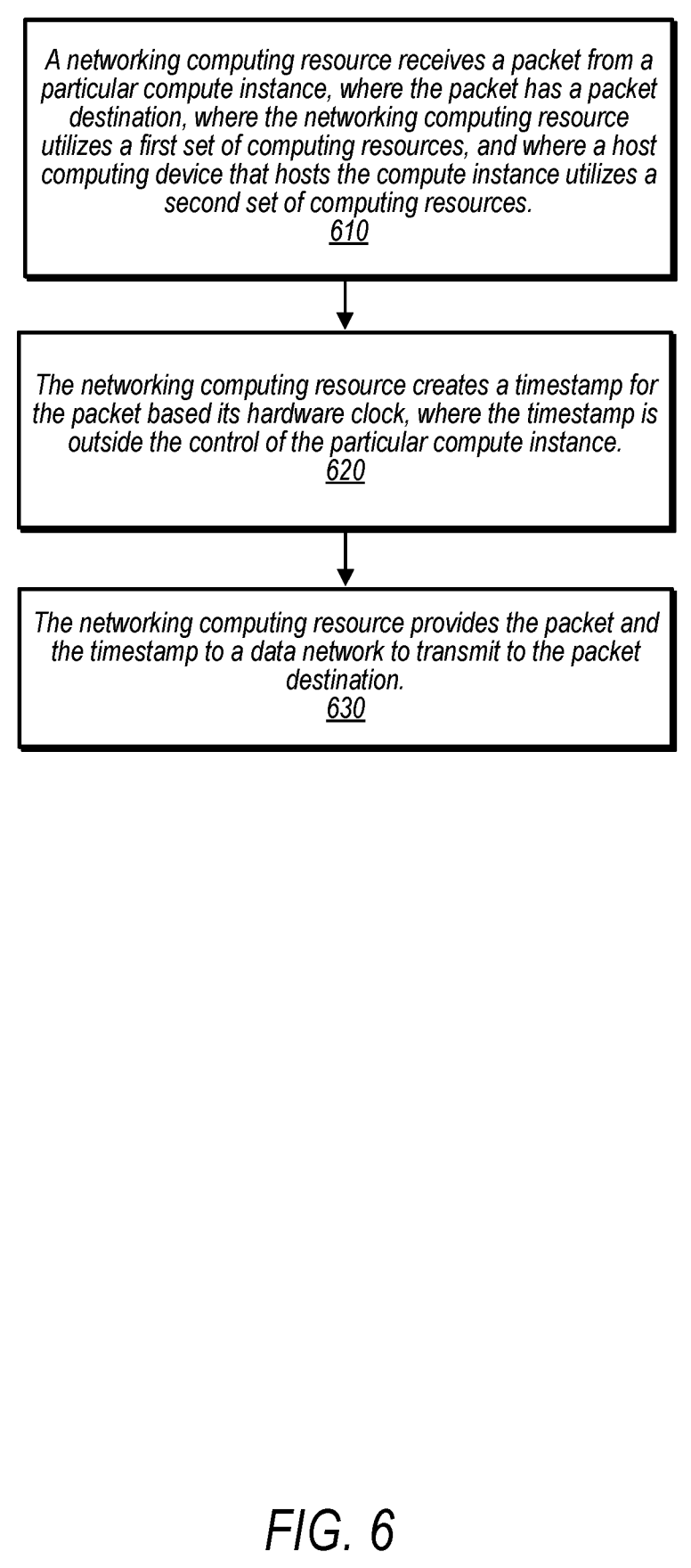

A networking computing resource receives a packet from a particular compute instance, where the packet has a packet destination, where the networking computing resource utilizes a first set of computing resources, and where a host computing device that hosts the compute instance utilizes a second set of computing resources.
610

The networking computing resource creates a timestamp for the packet based its hardware clock, where the timestamp is outside the control of the particular compute instance.
620

The networking computing resource provides the packet and the timestamp to a data network to transmit to the packet destination.
630

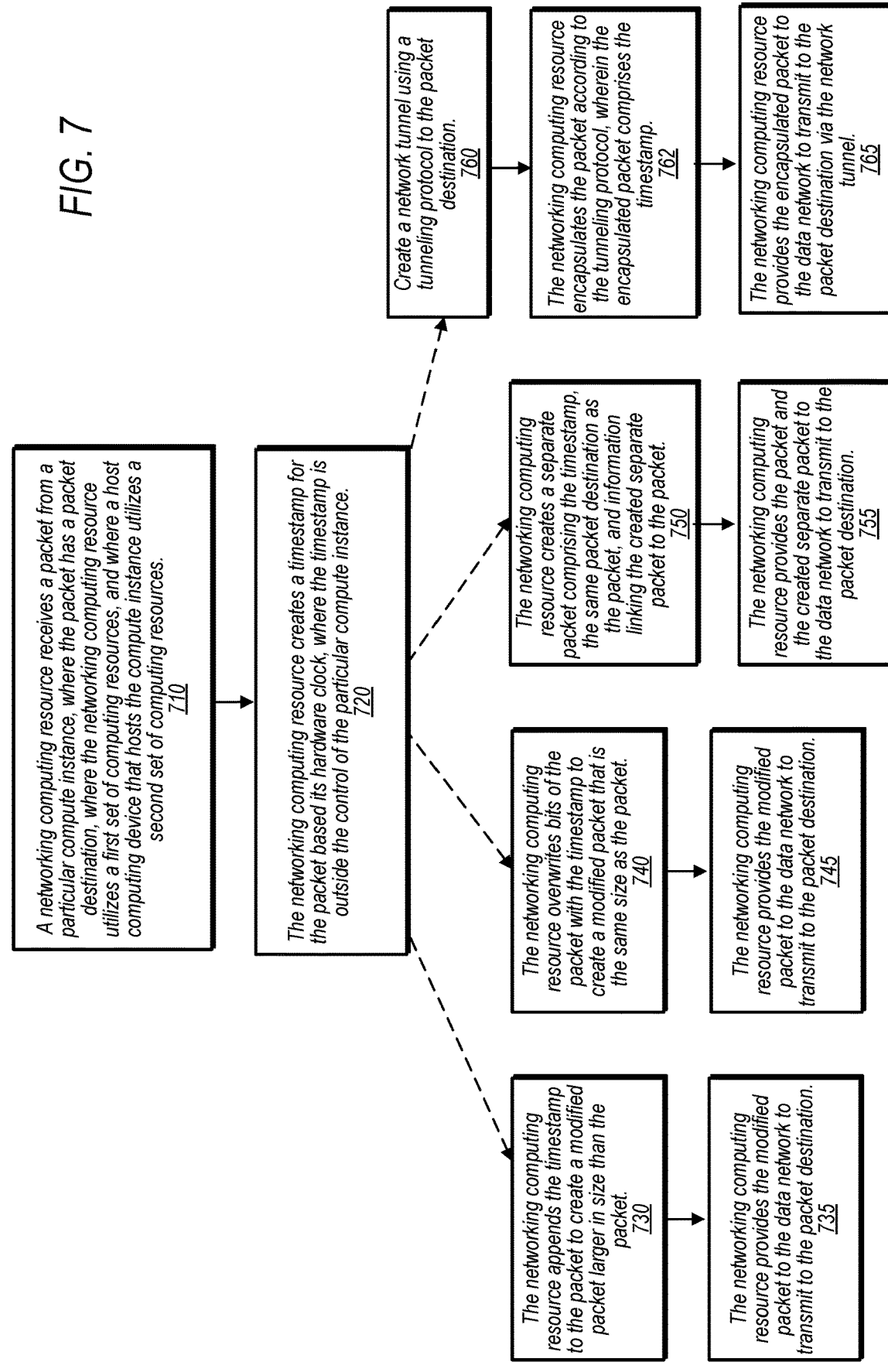

A networking computing resource receives a packet from a particular compute instance, where the packet has a packet destination, where the networking computing resource utilizes a first set of computing resources, and where a host computing device that hosts the compute instance utilizes a second set of computing resources.
*710*

The networking computing resource creates a timestamp for the packet based its hardware clock, where the timestamp is outside the control of the particular compute instance.
*720*

Create a network tunnel using a tunneling protocol to the packet destination.
*760*

The networking computing resource encapsulates the packet according to the tunneling protocol, wherein the encapsulated packet comprises the timestamp.
*762*

The networking computing resource provides the encapsulated packet to the data network to transmit to the packet destination via the network tunnel.
*765*

The networking computing resource creates a separate packet comprising the timestamp, the same packet destination as the packet, and information linking the created separate packet to the packet.
*750*

The networking computing resource provides the packet and the created separate packet to the data network to transmit to the packet destination.
*755*

The networking computing resource overwrites bits of the packet with the timestamp to create a modified packet that is the same size as the packet.
*740*

The networking computing resource provides the modified packet to the data network to transmit to the packet destination.
*745*

The networking computing resource appends the timestamp to the packet to create a modified packet larger in size than the packet.
*730*

The networking computing resource provides the modified packet to the data network to transmit to the packet destination.
*735*

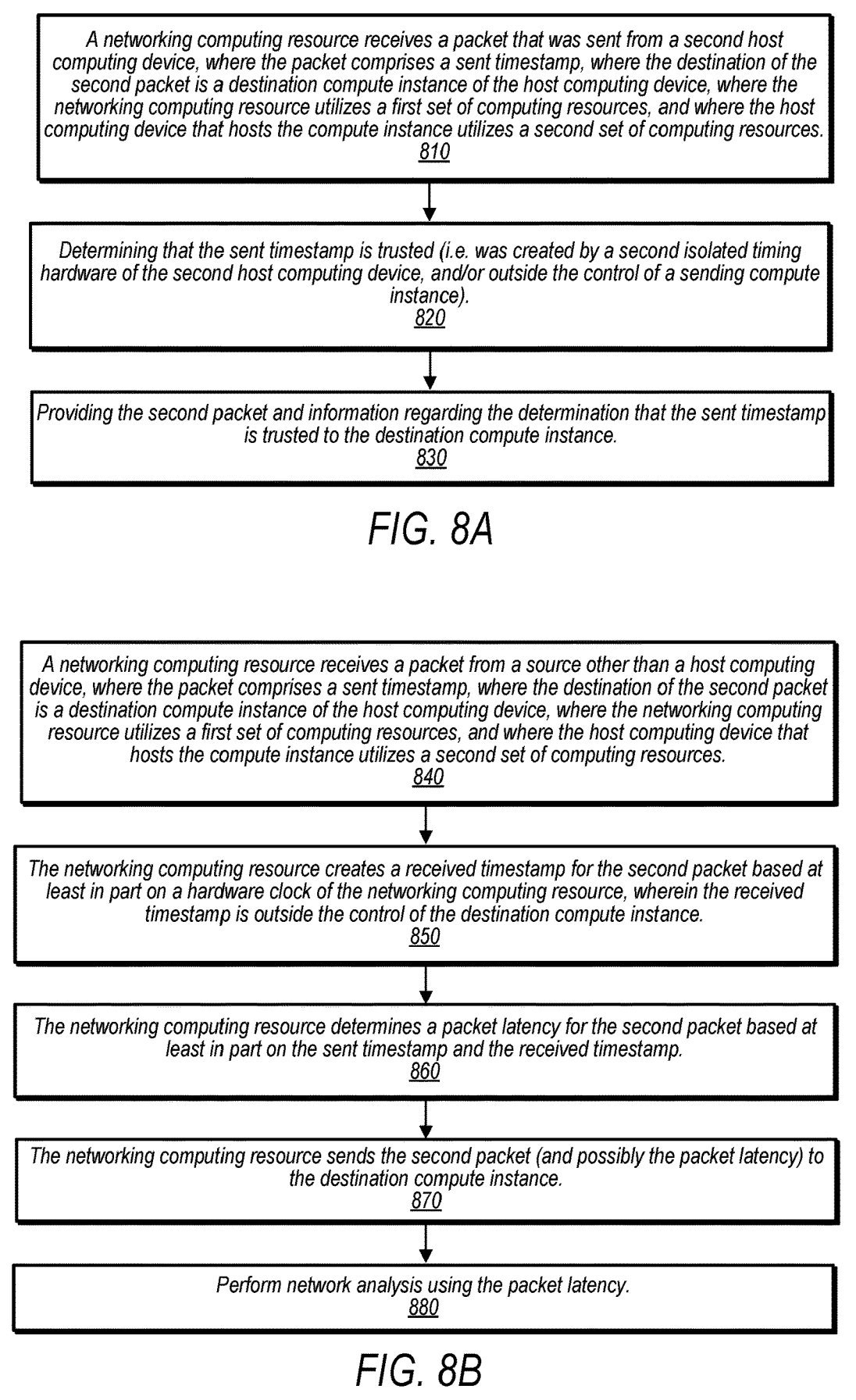

A networking computing resource receives a packet that was sent from a second host computing device, where the packet comprises a sent timestamp, where the destination of the second packet is a destination compute instance of the host computing device, where the networking computing resource utilizes a first set of computing resources, and where the host computing device that hosts the compute instance utilizes a second set of computing resources.
810

Determining that the sent timestamp is trusted (i.e. was created by a second isolated timing hardware of the second host computing device, and/or outside the control of a sending compute instance).
820

Providing the second packet and information regarding the determination that the sent timestamp is trusted to the destination compute instance.
830

*FIG. 8A*

A networking computing resource receives a packet from a source other than a host computing device, where the packet comprises a sent timestamp, where the destination of the second packet is a destination compute instance of the host computing device, where the networking computing resource utilizes a first set of computing resources, and where the host computing device that hosts the compute instance utilizes a second set of computing resources.
840

The networking computing resource creates a received timestamp for the second packet based at least in part on a hardware clock of the networking computing resource, wherein the received timestamp is outside the control of the destination compute instance.
850

The networking computing resource determines a packet latency for the second packet based at least in part on the sent timestamp and the received timestamp.
860

The networking computing resource sends the second packet (and possibly the packet latency) to the destination compute instance.
870

Perform network analysis using the packet latency.
880

*FIG. 8B*

TRUSTED OR ATTESTED PACKET TIMESTAMPING

BACKGROUND

To facilitate increased utilization of computing resources, such as in a data center, virtualization technologies may be used to allow a single physical computing device to host one or more instances of virtual machines that appear and operate as independent computing devices to users. With virtualization, the single physical computing device can create, maintain, delete, or otherwise manage virtual machines in a dynamic manner. In turn, users of a virtualized computing service can request computer resources, including single computing devices or a configuration of networked computing devices, and be provided with varying numbers of virtual machine resources. These virtual machines may carry out a wide variety of functionalities otherwise possible on a non-virtualized hardware device, such as invoking network-accessible services, conducting data processing, and the like.

In some cases, information, such as packets, sent from virtualized computing resources may arrive at a packet recipient in a time order that varies from an order in which the information (e.g., packets) were sent. For example, varying network latencies, varying network configurations, varying geographical distances, etc. between a packet transmitting computing resource and a packet receiving computing resource may cause a packet that was sent first in time to arrive at a destination location subsequent to a packet that was sent second in time. In some applications, such time sequence variabilities may be inconsequential. However, in other applications, such as those that determine a priority based on a time-ordering, such differences may be consequential. In addition, even when packets are received in the order they were sent, the destination location sometimes would like to know and/or verify when the packets were sent. To ensure fairness in such applications, a trusted mechanism is needed to implement a highly accurate time ordering of packets at a destination location, wherein the ordering at the destination location is determined based on time of transmission of the packets at packet transmitting computing resources. In addition, a trusted mechanism is needed for applications (or regulatory environments) that simply require logging of the real time at which an event occurred.

BRIEF DESCRIPTION OF THE DRAWINGS

FIGS. 5A-5D illustrates different options for packaging a packet and a timestamp in order to provide the packet and the timestamp to a data network for transmission to a packet destination, according to some embodiments.

FIG. 6 is a flowchart of an illustrative method that can implement trusted packet time-stamping, where a networking computing resource receives a packet from a particular compute instance, creates a timestamp for the packet based its hardware clock, where the timestamp is outside the control of the particular compute instance, and provides the packet and the timestamp to a data network to transmit to the packet destination.

FIG. 7 is a flowchart of example methods according to some embodiments that can be used to implement trusted packet time-stamping, where a networking computing resource receives a packet from a particular compute instance, creates a timestamp for the packet based on its hardware clock, where the timestamp is outside the control of the particular compute instance, and then may perform one of four different options for packaging the packet and the timestamp in order to provide the packet and the timestamp to a data network for transmission to the packet destination, according to some embodiments.

FIG. 8A is a flowchart of an illustrative method that can be used to implement trusted packet time-stamping, where a networking computing resource receives a packet from a particular compute instance, determines that the sent timestamp is trusted, and provides the second packet and information regarding the determination that the sent timestamp is trusted to the destination compute instance.

FIG. 8B is a flowchart of an illustrative method that can be used to implement trusted packet time-stamping, where a networking computing resource receives a packet from a particular compute instance, creates a timestamp for the packet based on its hardware clock where the timestamp is outside the control of the particular compute instance, determines a packet latency for the second packet based at least in part on the sent timestamp and the received timestamp, and sends the second packet (and possibly the packet latency) to the destination compute instance, and where the method further performs network analysis using the packet latency, according to some embodiments.

Figure 1:
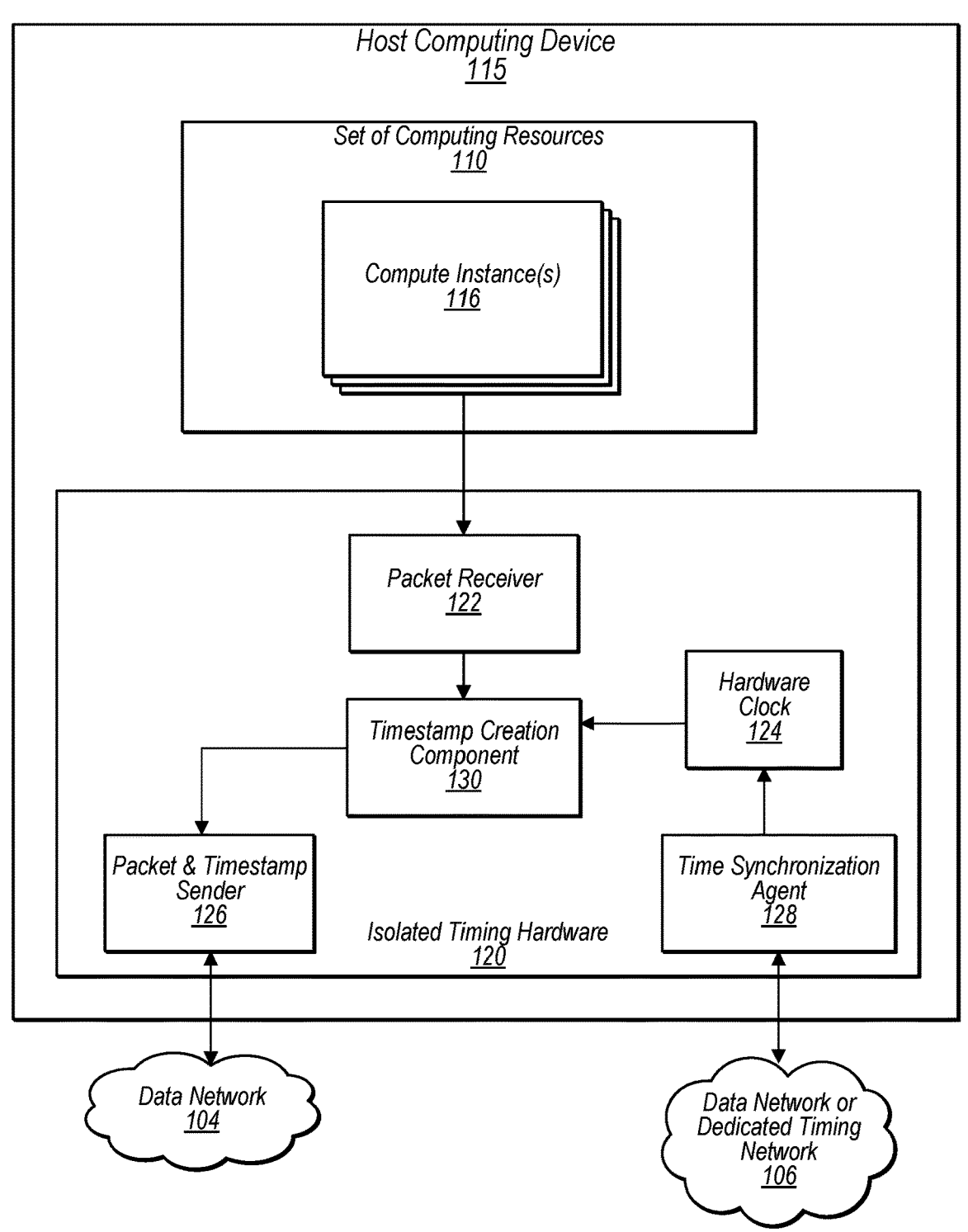
FIG. 1 depicts a logical model of a sending host computing device providing a trusted packet time-stamping service, where a host computing device hosts compute instances using a set of computing resources, where the host computing device also comprises isolated timing hardware that is outside the control of the compute instances, where a time synchronization agent synchronizes a hardware clock using a dedicated timing network, and where a timestamp creation component creates a timestamp for individual packets received by a packet receiver using the hardware clock, and where a packet and timestamp sender sends the packets and the timestamps to a data network, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

In addition, in the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., a network interface card (NIC) or a general-purpose processor executing software) to operate in a manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION OF EMBODIMENTS

Embodiments of the systems and methods, as described herein, implement providing highly accurate time information for time-stamping packets of compute instances, such that the clock of a piece of isolated timing hardware included in (or associated with) a host computing device (that hosts the compute instance) can be used for time-stamping packets that have left a compute instance implemented on the host computing device. The isolated timing hardware may be physically and logically positioned such that a packet being time-stamped by the isolated timing hardware has left the control of the compute instance and therefore cannot be altered by a user to whom the compute instance is allocated. For example, a service provider that provides a virtualized computing service may have exclusive access to the packet that has left the compute instance and the application of the time stamp to the packet, such that the service provider can give a guarantee or an "attestation" as to the genuineness of the time stamp. Moreover, the service provider network may synchronize isolated timing hardware across multiple host computing devices within microseconds or nanoseconds to a reference timekeeping device (and thus, within microseconds or nanoseconds of other pieces of isolated timing hardware included in or associated with other host computing devices that are also synchronized to the reference timekeeping device). In some embodiments of the systems and methods described herein, a virtualized computing service may provide a guaranteed and/or attested time stamping service that operates across user accounts of a provider network. Some of these embodiments provide a feature to embed provider network certified packet time stamps on transactions that a user sends (e.g., to a service such as a virtual exchange). In some embodiments, the recipient is provided a mechanism to access the time stamp and also determine whether it is a certified timestamp against an accurate time source. Because the isolated timing hardware is included in the host computing device or is located physically adjacent to the host computing device and is further synchronized to a highly-accurate reference time-keeping device, the guaranteed and/or attested time stamping service can provide time stamped packets that very accurately reflect a time of transmission of a given packet from a port of a compute instance implemented on a given host computing device. At a destination location for the packet (and other time-stamped packets sent from other computing instances), the packets can be ordered based on a highly accurate time of transmission to guarantee a fair processing order of the received packets.

Users of datacenters such as provider networks depend on accurate time as a critical component of web-scale, distributed applications, for example. In traditional systems, it is difficult to achieve high-fidelity timestamps due to hardware and network variability. User workloads requiring microsecond-range accuracy, such as financial trading, broadcasting, and next-generation databases have been unable to take advantage of provider networks, because of the lack of time accuracy. Some organizations may run these workloads on-premises and maintain their own time infrastructure, which is expensive and a significant operational burden. Other clock-sensitive applications that can run on provider networks, including distributed databases and storage, typically incorporate programmed delays with wait periods, data locks, and transaction journaling to maintain consistency at scale.

Some embodiments of the system and methods for providing highly accurate time information for time-stamping packets use methods of time synchronization of isolated timing hardware that improves local clock accuracy to within microseconds (or nano-seconds) of a given time, such as UTC time. With reliable, at-scale microsecond-range clock accuracy and network packet time-stamping in provider networks, users can migrate and modernize their most time-sensitive applications using a cloud-computing provider. Additionally, users maybe able to easily audit if any system providing highly accurate time information for time-stamping packets is working and providing the expected microsecond-range accuracy.

Highly accurate clocks are critical for a variety of applications: (a) Distributed systems, such as databases, synchronizing between geographically distributed instances. They require an accurate clock as well as a bounded estimate of the error to enforce wait periods and lock on data access requests; (b) Financial transactions requiring accurate time-stamping to support and audit fair and equal access regulatory requirements. European Union MiFID II regulations require accuracy within 100 microseconds for many trading applications, for example; and (c) Recently published standards by the Advanced Media Workflow Association (AMWA) require a PTP interface and clock accuracy within 100 microseconds of UTC time. Other applications that can also benefit from access to a reliable clock source and timestamped transactions include: (a) Logging and root cause analysis applications. With highly accurate timestamps and improved packet timestamping locations, users can do network introspection one-way across network hops without requiring a round trip response to measure latency; and (b) Authentication and authorization protocol applications that accept connections only with correct timestamps. If the difference in time is too large or if the time is in the future from the perspective of the server, the request will be rejected. For example, some kinds of signatures expire after a fixed amount of time. With reliable, distributed time sources, the valid time before signature expiration can be shortened.

Some users need to be able to verify that time stamps have not been tampered with or modified. A key requirement for equity exchanges that could use a datacenter or provider network, for example, may include fair and equal access, which is typically implemented through careful management of the physical hardware infrastructure of exchanges. This physical hardware management may include providing equal length network cables to their customers, as an example, to ensure equal packet transmission latencies. In datacenters and provider networks, these mechanisms need to be replaced by something that works in a more loosely coupled virtual environment. Therefore, some embodiments provide a feature for the datacenter or provider network itself to embed certified packet time stamps on transactions that a user sends (e.g., to a service such as a virtual exchange). These time stamps are outside the control of the users, and/or outside the control of any compute instances that are controlled by users. In addition, in some embodiments, a recipient of such packets is provided a mechanism to access the time stamp and also determine whether it is a timestamp certified against an accurate time source. Such a system allows a recipient, such as a virtual exchange, to process transactions in the order in which they were transmitted rather than the order of reception, for example.

More specifically, embodiments of the present disclosure provide for data centers including two distinct communication networks: a first packetized data network supporting standard network communications of instances, and a second network dedicated to providing highly accurate synchronized time information, such as a pulse-per-second signal. The dedicated time network may include one or more reference timekeeping devices configured to provide highly accurate time information, such as by synchronization to a global navigation satellite system (GNSS), like the global positioning system (GPS). Host computing devices within a data center may be provisioned with isolated timing hardware that accepts time information from the dedicated time network and uses that time information to maintain highly accurate time relative to the reference timekeeper. The isolated timing hardware may further provide a trusted mechanism to time-stamp packets using the highly accurate time information. Because time information is provided by hardware local to the hosted instances, and need not traverse a network external to the host, the time information may be highly accurate relative to traditional NTP, such as within 100 microseconds, within 20 microseconds, or less. Further, embodiments of the present disclosure can provide for multiple dedicated time networks, and for selection of a network to be used for time information based on analysis of those networks, further increasing accuracy in timekeeping.

A known and long-standing problem within distributed computing systems is the difficulty is synchronizing time information between devices. Many computing devices utilize crystal oscillators to keep time. These oscillators, in theory, operate at a known frequency, and thus time can be measured by the signal provided by an oscillator. However, in practice the frequency of an oscillator varies based on various factors, such as operating temperature. While frequency variation may be minute, it can be sufficient to cause substantial desynchronization between two different devices. Another source of error in time synchronization is the mechanism by which two devices are synchronized. In general, synchronization becomes less accurate as devices are moved further apart, as the laws of physics dictate a maximum speed at which time information can move between devices, which speed is further reduced by various limitations of the equipment used to transmit data between devices. While time synchronization techniques can attempt to overcome this problem by adjusting for transmission time, this approach has its limits. For example, it cannot generally account for asymmetrical delays, where a round-trip communication time between two devices is unevenly split between and outgoing and returning communication path. In this case, a first device may receive time information from a second device, but be unsure as to how much time has elapsed during transmission of the information from the second to the first device. Moreover, such techniques generally cannot account for variance in transmission times, which may occur for example due to congestion on a network. Thus, time information is often inaccurate.

One large scale application where accurate time information may be desired is in hosted computing environments, sometimes referred to as "cloud computing" environments. One typical tenant of such environments is hardware commoditization: users of such environments are often provided with a general outline of the hardware on which a hosted compute instance will execute, but are relieved of selecting and maintaining individual hardware. This provides for extreme flexibility-failure of a single set of hardware that can be addressed, for example, by invisibly relocating a hosted compute instance to another set of hardware. In the context of cloud computing, time synchronization becomes particularly problematic, as hosted computing environments often span multiple data centers within a given geographic region and multiple geographic regions around the globe. If such environments attempt to provide synchronization among all hosted compute instances, there may be an expectation that such synchronization does not depend on the particular hardware hosting the instance, the particular location of that hardware, or the like. Accordingly, given the limitations to time synchronization noted above, providing accurate time information across a hosted computing environment is very difficult, and inaccuracies can occur.

While these inaccuracies may be trivial in non-computerized environments (as human interactions are rarely concerned with microsecond differences in notions of time), they can create significant problems in computerized environments. For example, computerized transaction handling may be required to address conflicting, near-simultaneous transactions. In a distributed system, various complex techniques must be adopted to attempt to address such transactions, as merely using a "transaction time" at each distributed device may introduce unexpected results given potentially different notions of time at each device. Similarly, some computer applications, such as handling of financial transactions, demand highly accurate time-stamping, which in turn requires highly accurate time on a device.

One mechanism for addressing these problems would be to equip every computing device with a highly accurate reference timekeeping device. For example, each device may have installed within it an atomic clock, which is manually synchronized with an initial reference point (e.g., by physically co-locating the atomic clock and the reference point). Alternatively, each device may have installed a GNSS receiver configured to determine a present time by reference to a GNSS. Neither approach is feasible at large scale, both due to the cost and complexity of these time keeping devices and the logistical problems with setting up and maintaining such devices.

Embodiments of the present disclosure address the above-noted problems by providing highly accurate time information at hosted compute instances in a manner that does not require a per-instance reference timekeeping device and that preserves flexibility of the hosted computing environment by requiring little or no modification to operation of hosted compute instances. More specifically, embodiments of the present disclosure provide for one or more reference time keeping devices within a data center to be synchronized with isolated timing hardware of (or associated with) host computing devices in the data center by use of a dedicated time information network, used exclusively for transmission of time information. The dedicated time network may provide highly accurate (e.g., to the nanosecond level) time information to isolated timing hosting hardware of host computing devices. A networking computing resource, such as isolated timing hardware of the hosting hardware, in turn, can timestamp packets received from a particular compute instance hosted by other computing resources of the hosting hardware. This networking computing resource can be located on a network interface card (NIC) of the hosting hardware, in some embodiments. This networking computing resource, such as the isolated timing hardware, can create a timestamp for the packet based at least in part on the hardware clock of the networking computing resource, where the timestamp is outside the control of the compute instances hosted by the hosting hardware, and can provide the packet and the timestamp to a data network distinct from the dedicated time network to transmit to the packet destination, in some embodiments.

As disclosed herein, a data center may include a number of host computing devices interconnected via a non-dedicated, packet-switched communication network. Each host computing device may host one or more compute instances, which may include virtual compute instances (e.g., with virtualized hardware provided by software executing on the host device, such as a hypervisor) or a bare metal instance (e.g., an instance with direct access to hardware of the host computing device). Compute instances may communicate via the non-dedicated network and with a wider network, such as the Internet. In addition, in some embodiments, a data center may include one or more dedicated networks carrying time information. In other embodiments, time information can be carried by the regular data network of the data center. Illustratively, each dedicated time network may be connected to a reference timekeeper device, such as a GNSS-connected timing device. The reference timekeeper device may transmit a PPS signal (or other fixed-width signal) via the dedicated time network, which may thus be broadcast to receiving devices on the network. The dedicated time network can be configured to maintain an extremely high level of accuracy for the time information, potentially on the order of tens of microseconds or nanoseconds. For example, the dedicated time network may implement the Synchronous Ethernet (SyncE) standard to maintain synchronization between devices of the network, or may implement designs and protocols of the White Rabbit Project, a network design known in the art that itself utilizes SyncE, to facilitate distribution of time information. Each host computing device may include hardware that interfaces with and receives the signal from the dedicated time network, thus facilitating synchronization between the host computing device and the reference timekeeping device. For example, such hardware may include a networking computing resource, such as isolated network hardware, included in the host computing device or physically adjacent to the host computing device. In some embodiments, the isolated timing hardware may include a network interface card (NIC) and one or more sockets that perform packet encapsulation and/or packet encryption. In one embodiment, the dedicated time network carries a PPS (or other fixed-width) signal from a reference time keeper exclusively, which signal is aligned to the relevant time boundary (e.g., which pulses at the correct second boundary). Accordingly, to determine a current time, it may be necessary for the hardware (e.g., isolated timing hardware) also to obtain a reference point, indicating which second it currently is. As this reference point need not be highly accurate in order to achieve synchronization, the hardware (e.g., isolated timing hardware) may obtain the reference point via the non-dedicated network, such as via communication with an NTP server on the non-dedicated network. The hardware (e.g., isolated timing hardware) may then determine the current time to a high degree of accuracy by combining the reference point with second boundary indicated by the PPS signal. Moreover, the hardware (e.g., isolated timing hardware) may provide an indication of the current time to a timestamp creation component for use in time stamping packets transmitted by one or more computing instances implemented on the host computing device.

In one embodiment, the hardware within each host computing device that is used to provide time information is distinct from hardware used to host compute instances. For example, the hardware used to provide time information may be a physical offload card connected to other hardware of the host computing device via a Peripheral Component Interconnect (PCI) Express bus. The offload card may include independent computing resources, such as an independent processor and memory, to avoid contention for resources with hosted compute instances. In some cases, a portion of these resources may be dedicated to processing of time information, to further avoid potential issues related to resource contention.

In some embodiments, a dedicated time network may include multiple reference timekeeping devices, each of which for example transmits PPS (or other fixed-width) signals among a portion of the network. One or more devices within the dedicated time network may be configured to select among the signals provided by each timekeeping device in order to identify a "lead" signal to follow as a source of time. Illustratively, host computing devices in a data center may be physically arranged into units, such as racks. Each rack may include a switch on the dedicated time network with logic to select among multiple signals, each provided by a different reference timekeeping device. The switch may include hardware, such as a field-programmable gate array (FPGA), that can be configured to provide at very low latency a selected signal to each host computing device on the unit. Accordingly, the switch may inspect the available signals, select an appropriate signal, and reconfigure the FPGA to provide the signal to the devices of the unit. To facilitate seamless operation, the switch may include multiple FPGAs, such that a first FPGA can continue to send time information from a prior reference timekeeping device while a second FPGA is configured to send such time information from a new reference timekeeping device.

In one embodiment, the switch selects a reference time signal based on a consensus algorithm. For example, if a majority (or other consensus threshold) of signals occur within a threshold period, the switch may select a signal from that set (e.g., an earliest, latest, closest to average, etc.) to provide to host computing devices of the unit. In another embodiment, the switch selects a reference timekeeping device based on metadata regarding the reference timekeeping devices, the dedicated time network, or a combination thereof. For example, a data center may include a computing device configured to conduct timekeeping analysis to detect delays or other issues that may prevent a reference timekeeping device from delivering an accurate signal. The analysis device may deliver such information to a per-unit switch to facilitate signal selection. While signal selection is discussed herein with respect to a per-unit switch, in some cases other elements of the dedicated time network, including isolated timing hardware of host computing devices, may conduct such signal selection.

In addition to monitoring for issues on the dedicated time network, in some embodiments an analysis device may conduct analysis with respect to individual network devices or host computing devices. As noted above, one source of error in timing at an individual computing device is changes in signal speed of a crystal oscillator within the device. In many cases, such changes are largely a function of temperature—with signal frequency increasing as temperature increases. Often, such devices have a manufacturer-specified curve that specifies a particular frequency range at a particular temperature. However, such curves are typically aggregates among many manufactured devices, and thus not specific to an individual device. Accordingly, adjusting time information at a device per manufacturer-specified curves may result in inaccuracies. Notably, these inaccuracies may be significant even when time information is provided by a reference timekeeping device, because internal time information of another device may be used to address delays in signal from a reference timekeeping device. For example, if the round-trip latency between a reference timekeeping device and another device is 10 microseconds and a network is configured to be (as much as possible) symmetrical, the other device may adjust the signal by 5 microseconds to account for network latency between the reference timekeeping device and the other device. However, if the other device has inaccurate time information, it may be unclear as to what constitutes 5 microseconds. Thus, accounting for internal frequency variations can be a significant element to maintaining accurate time information.

To account for internal frequency variations, embodiments of the present disclosure may include an analysis computing device configured to conduct an analysis of time information from one or more other devices with respect to temperature of those other devices. For example, the analysis device may collect or otherwise calculate latency information between each device and another device (e.g., a nearest other device) on a network, such as the dedicated time network. The analysis device may analyze the latency information with respect to a temperature of the monitored device, to detect variations in the latency that may be attributable to temperature-based frequency shift on the monitored device. From such analysis, the analysis device may generate temperature-based offsets for the monitored device, such that the device may apply the offset for a current temperature to its internal clock, thereby accounting for temperature-based frequency shift. With conventional timing techniques, such analysis may not be possible, as noise within timing measurements may overwhelm any "signal" of frequency shift. However, the highly accurate time information available within embodiments of the present disclosure can enable such analysis. In conjunction with highly accurate time information from a dedicated time network, this frequency shift offset may further increase the accuracy of time information at computing devices as discussed herein.

As will be appreciated by one of skill in the art in light of the present disclosure, the embodiments disclosed herein improve the ability of computing systems to provide highly accurate and trusted time-stamps to packets sent by users from compute instances. These time-stamps are outside the control of the compute instances, and consequently outside the control of the users, so that other users, or other entities outside of a datacenter or provider network, can "trust" that these timestamps have not been manipulated or tampered with by the users. In addition, the embodiments disclosed herein improve the ability of computing systems to provide highly accurate time information to hosted compute instances without requiring specialized configuration of such hosted compute instances. Moreover, the presently disclosed embodiments address technical problems inherent within computing systems; specifically, the difficulty of establishing a common notion of time within a distributed computing system with a high degree of accuracy, the difficulty of providing highly accurate time information across a fleet of distributed computing devices, and the difficulty of providing a guaranteed and/or attested time stamping service that operates across user accounts. These technical problems are addressed by the various technical solutions described herein, including the use of isolated timing hardware within a host computing device to synchronize to a reference timekeeper device by use of a dedicated time network, the use of the isolated timing hardware to create a timestamp for packets from users based at least in part on a hardware clock, wherein the timestamp is outside the control of any compute instances and consequently any users, and the use of the isolated timing hardware to provide a local interface for time information to hosted compute instances. Thus, the present disclosure represents an improvement in host devices and computing systems in general.

The foregoing aspects and many of the attendant advantages of this disclosure will become more readily appreciated as the same become better understood by reference to the following description, when taken in conjunction with the accompanying drawings.

FIG. 1 depicts an example host computing device 115 in which embodiments of the present disclosure can be implemented. FIG. 1 depicts a logical model of a host computing device 115 providing a trusted packet time-stamping service at the sending host computing device. The host computing device 115 hosts compute instances 116 using a set of computing resources 110. The host computing device 115 of this embodiment also comprises networking computing resources, such as isolated timing hardware 120, that is outside the control of the compute instances 116. In some embodiments the isolated timing hardware 120 is part of the host computing device 115, such as being part of the chassis, for example. In some of these embodiments, the isolated timing hardware 115 might be embedded within a network interface card (NIC). In other embodiments, the isolated timing hardware 120 is a completely separate entity from the host computing device 215. A time synchronization agent 128 synchronizes a hardware clock 124 using information from a data network or a dedicated timing network 106. If 106 is a data network, the data network 106 can be the same data network as 104, or a different data network. If it is a dedicated timing network 106, then the dedicated timing network 106 is a different network than the data network 104. A timestamp creation component 130 creates a timestamp using the hardware clock 124 for individual packets received by a packet receiver 122 from one or more of the compute instances 116. A packet and timestamp sender 126 sends the packets and the timestamps to a data network 104, according to some embodiments.

Therefore, the networking computing resource, such as the isolated timing hardware 120, receives a packet from a particular compute instance of the one or more compute instances 116, where the packet comprises a packet destination, in some embodiments. The networking computing resource, such as the isolated timing hardware 120, utilizes a first set of computing resources (which may or may not be part of the host computing device 115, depending on the embodiment) distinct from a second set of computing resources 110 of a host computing device 115 that host the one or more compute instances 116. The networking computing resource, such as the isolated timing hardware 120, creates a timestamp for the packet (using a timestamp creation component 130) based at least in part on the hardware clock 124 of the networking computing resource, where the timestamp is outside the control of the one or more compute instances 116, including the particular compute instance. The networking computing resource, such as the isolated timing hardware 120, provides the packet and the timestamp (using a packet and timestamp sender 126) to a data network 104 to transmit to the packet destination.

Figure 2:
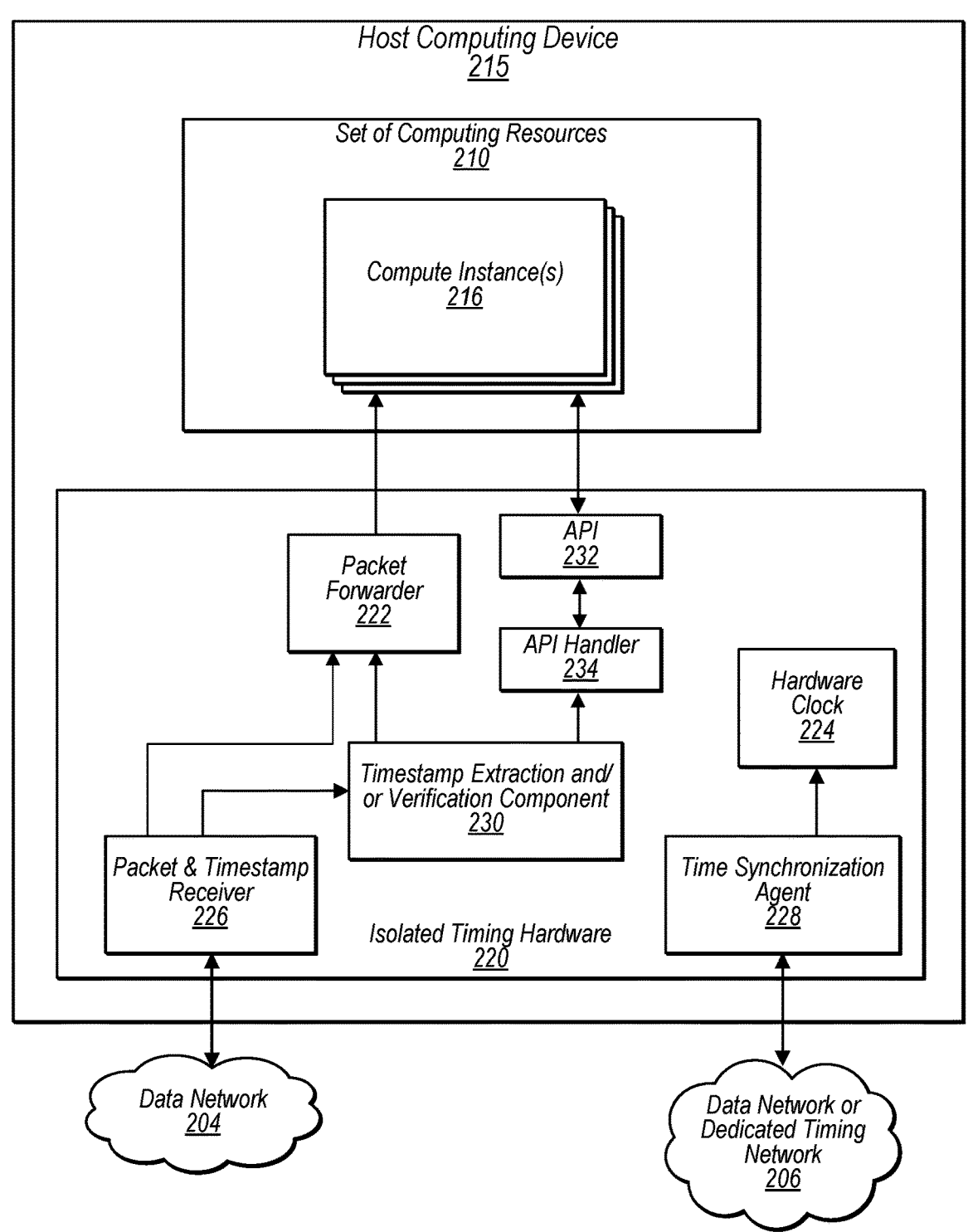
FIG. 2 depicts a logical model of a receiving host computing device, where a host computing device hosts compute instances using a set of computing resources, where the host computing device also comprises isolated timing hardware that is outside the control of the compute instances, where a packet & timestamp receiver receives packets from other hosts, where a timestamp extraction and/or verification component extracts and/or verifies the timestamp of the packet, and where the packet and timestamp information is communicated to the destination compute instance through a packet forwarder and/or an API, according to some embodiments.

FIG. 2 depicts an example receiving host computing device 215 in which embodiments of the present disclosure can be implemented. FIG. 2 depicts a logical model of a host computing device 215 providing a trusted packet time-stamping service at the receiving host computing device. Of course, any host computing device can send and receive packets, but while FIG. 1 focused on the sending of packets with trusted and/or attested packet timestamping, FIG. 2 focuses on the receiving of packets with trusted and/or attested packet timestamping. The host computing device 215 again hosts compute instances 216 using a set of computing resources 210. The host computing device 215 of this embodiment also comprises networking computing resources, such as isolated timing hardware 220, that is outside the control of the compute instances 216. A time synchronization agent 228 synchronizes a hardware clock 224 using information from a data network or dedicated timing network 206. If 206 is a data network, the data network 206 can be the same data network as 204, or a different data network. If a dedicated timing network 206, then the dedicated timing network 206 is a different network than the data network 204. The hardware clock 224 is not, in this embodiment, used when a packet is received (unless the receiving isolated timing hardware 220 were to create a reception timestamp for the packet) but is simply shown for completeness.

The networking computing resource, such as the isolated timing hardware 220, receives a packet through the data network 204 using the packet & timestamp receiver 226. In some embodiments, the received packet was sent from another sending host computing device of a plurality of host computing devices. The received packet comprises a sent timestamp. The destination of the received packet is a destination compute instance of the one or more compute instances 216 hosted by the host computing device 215. The packet & timestamp receiver 226 provides the packet to a timestamp extraction and/or verification component 230. Depending on the embodiment, the timestamp extraction and/or verification component 230 can extract the timestamp from the packet and/or verify that the timestamp is from a trusted sending host computing device, where the timestamp was outside the control of the sending compute instance. In some embodiments, the timestamp extraction and/or verification component 230 can cryptographically certify that the sent timestamp was created by isolated timing hardware of another host computing device. In other embodiments, the destination compute instance 216 cryptographically certifies that the sent timestamp was created by isolated timing hardware of another host computing device and/or that the timestamp was created outside the control of the sending compute instance. In some of these embodiments where the compute instance certifies the timestamp, the timestamp extraction and/or verification component 230 is not used, not present, and/or bypassed. In these embodiments, the packet would be sent to the destination compute instance 216, which would cryptographically certify the timestamp, such as by using the public key of the trusted authority (such as the provider network). In some embodiments, the timestamp extraction and/or verification component 230 determines that the sent timestamp was created outside the control of a sending compute instance.

In some embodiments, the timestamp extraction and/or verification component 230 can provide the received packet and/or information regarding the certification and/or determination to the destination compute instance of the compute instances 216, through the use of a packet forwarder 222. The packet forwarder 222 can forward the packet from either the packet & timestamp receiver 226, or from the timestamp extraction and/or verification component 230, depending on the embodiment, to one of the compute instances 216. In some embodiments, an API 232 can be provided to the compute instances in order for them to obtain the timestamp information. The API calls can be handled by the API handler 234, which can obtain the timestamp information from the timestamp extraction and/or verification component 230, and provide that timestamp information in response to API calls. In embodiments, the API 232 and API Handler 234 would be provided by the control plane of the compute instances, instead of by the isolated timing hardware 220.

There are many ways to implement how the receiving host computing device 215 or receiving instance 216 obtains and/or uses the timestamps in packets that are received from other host computing devices, depending on the embodiment. In some embodiments, the isolated timing hardware 220 extracts the timestamp from the packet (using the timestamp extraction and/or verification component for example) and passes that timestamp to the destination compute instance. Some of these embodiments might involve modifying the operating system to allow passing timestamp information to the compute instance. The timestamp information can be passed using a control channel, in some embodiments. The timestamp information can be metadata on top of the data of the packet itself. The timestamp can be extracted by hardware, and then passed to software to provide it to the compute instance, in some embodiments. In some embodiments, the timestamp can be provided in the packet as part of the NIC or ENA interface, or can provided as an additional data field in the descriptor, so that the driver and software stack does not need to be modified. If a tunnel is used to transport packets between host computing devices, in these embodiments, it is transparent to the user, and instead implemented by the isolated timing hardware and/or the control plane of the compute instances.

In other embodiments, the packets can be fully encapsulated as part of a tunnel. In some of these embodiments, the tunnel is understood and created by the user of the compute instance, in order to form an instance to instance tunnel. In some of these embodiments, when the packet is transported through the isolated timing hardware, the isolated timing hardware overwrites part of the encapsulated packet (which was encapsulated at the instance) with the timestamp information. In some embodiments, the timing information and the regular data of the packets are in two different paths in terms of how they can be retrieved. The receiving application running on the compute instance can retrieve the data of the packet, and as a separate operation (either through the operating system, such as an API, or through tunnel monitoring) can retrieve the timestamp information of that packet. Therefore, one embodiment would require the modification of the operating system, and other embodiments don't need to modify the operating system. However, in all cases the timestamp information needs to be retrieved in addition to the normal data flow.

To some extent, the timestamp of the received packet is inherently guaranteed to the receiver because of the way the ecosystem was built. The sending instance does not have the opportunity to set the timestamp. However, there can be different ways for the receiver to know that the sender is sending timestamp packets, and that these packets were beyond the control of the sending instance. One way is for the isolated timing hardware 220 of the receiving host computing device 215 to guarantee to the destination compute instance 216 that the timestamp is should be trusted. The isolated timing hardware 220 at the receiver knows, because of the protocol, where the timestamp is located in the packet and that it is authentic and trustworthy. In other embodiments, when a relationship is set up between a sender and receiver, such as a VPC peering, an API can be used to indicate that packets sent across the relationship may have a feature selected such that the timestamps are signed, and the control plane and/or isolated timing hardware can implement the signing. In some of these or other embodiments, the control plane and/or isolated timing hardware of the sender can sign the timestamps as an additional signature, so that the timestamps are delivered to the destination compute instances in a structure that contains a cryptographic signature that the receiver can validate.

It should be noted that while, FIG. 2 illustrates isolated timing hardware 220 that comprises hardware clock 224 and time synchronization agent 228 as performing the packet reception and timestamp extraction, in some embodiments, a hardware component that performs timestamp extraction, such as a virtualization offloading for compute instances 216, may perform similar packet reception and timestamps extraction functions without requiring a time synchronization agent 228 and a hardware clock 224. For example, in some embodiments, virtualization offloading hardware included in a chassis of host computing device 215 (e.g., a hardware component similar to isolated timing hardware 220, but lacking time synchronization agent 228 and/or with a more simplified hardware clock 224, for example) may include a packet and timestamp receiver 226, a timestamp extraction and/or verification component 230, a packet forwarder 222, and optionally include an API handler 234 and an API 232.

In some embodiments, a single piece of isolated timing hardware may include both components for creating time-stamped packets upon sending an outgoing packet (e.g., as shown in FIG. 1) and may also include components for extracting time stamps (e.g., as shown in FIG. 2). For example, in some embodiments, a single piece of isolated timing hardware 120/220 may include packet receiver 122, timestamp creation component 130, packet and timestamp sender 126, packet and timestamp receiver 226, timestamp extraction and/or verification component 230, packet forwarder 222, API handler 234, and API 232. In such embodiments, the isolated timing hardware 120/220 may include a single hardware clock 224 that is used to determine an accurate time to use in timestamping outgoing packets, and which may be used to determine a reception time of incoming packets. Also, the single hardware clock 224 may be synchronized using a time synchronization agent (e.g., 128 or 228). Said another way, hardware clock 224 and time synchronization agent 228 may not necessarily be duplicated in an isolated timing hardware configured to both send and receive packets comprising trusted or attested time stamps.

Figure 3:
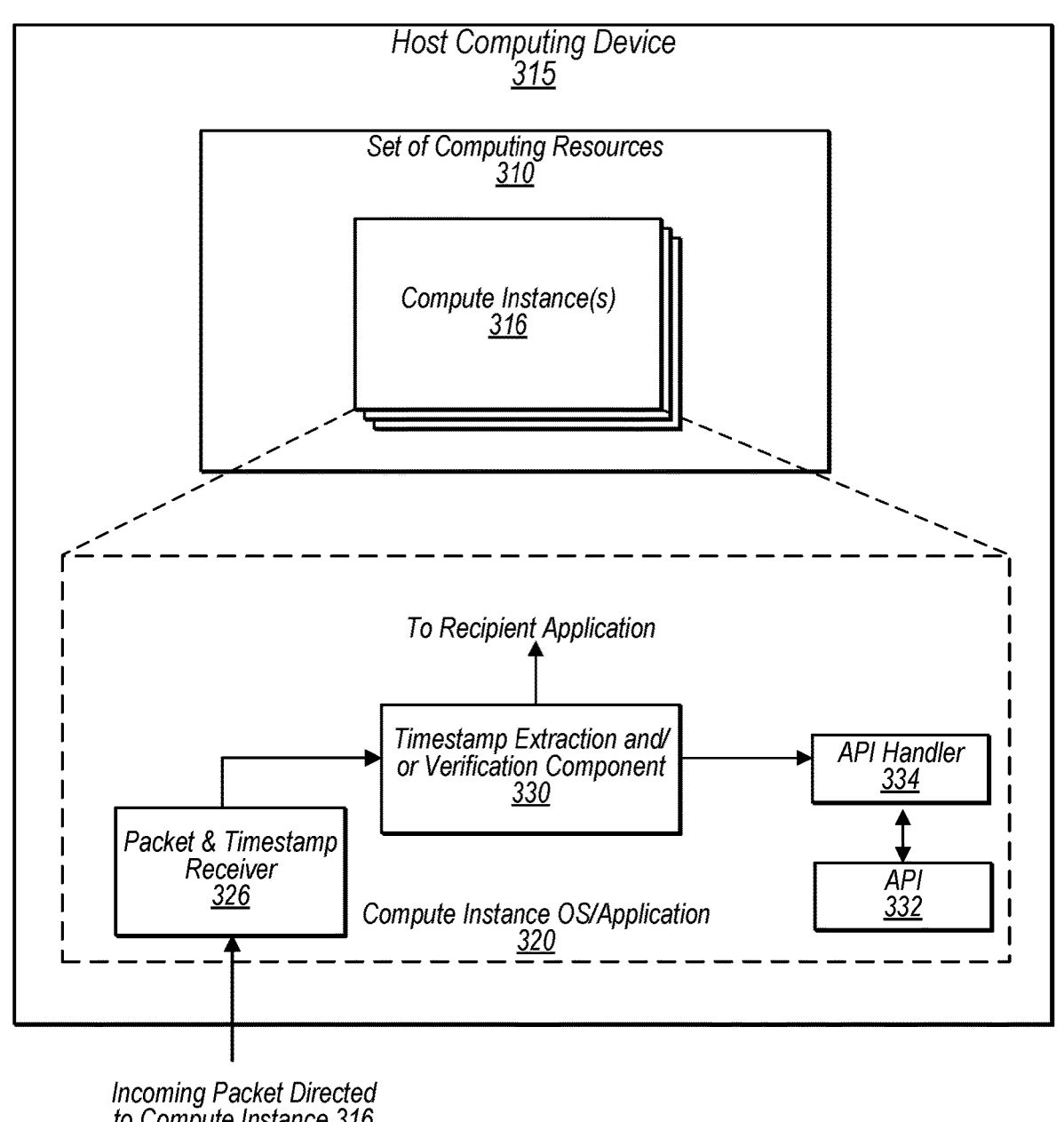
FIG. 3 depicts a logical model of a receiving host computing device, wherein a timestamp extraction and/or verification component is implemented in software on a computing instance hosted on the receiving host computing device, according to some embodiments.

As mentioned above, in some embodiments, timestamp extraction may be performed in software as opposed to being performed by isolated timing hardware, such as isolated timing hardware 220. For example, FIG. 3 depicts a logical model of a receiving host computing device, wherein a timestamp extraction and/or verification component is implemented in software on a computing instance hosted on the receiving host computing device, according to some embodiments.

In some embodiments, an incoming packet routed to compute instance 326, which may have been routed to compute instance 316 via an overlay network of a data center, is received at packet and timestamp receiver 326, which may be implemented in an operating system of compute instance 326 and/or which may be implemented as an application executing at compute instance 316. The packet and timestamp receiver 326 may store the incoming packet in a queue of packets comprising timestamps indicating when the packets were sent. Timestamp extraction and/or verification component 330 may extract timestamps from the packets queued in packet and timestamp receiver 326. In some embodiments, timestamp extraction and/or verification component 330 may additionally queue packets and release packets from the queue based on the timestamps. For example, timestamp extraction and/or verification component 330 may provide packets to a recipient application in an order in which the packets were transmitted at sending host computing instances, as opposed to an order in which the packets were received at a recipient host computing device. In other embodiments, timestamp extraction and/or verification component 330 may release packets and associated timestamp information to recipient application in an order in which the packets were received and the recipient application may take into account the time of transmission of the packets as indicated in the associated time stamps when further processing the packets.

In some embodiments, in which timestamp extraction is implemented in software, the software may additionally include an API handler 334 that makes an API call to API 332 to verify the timestamp in a similar manner as described above in regard to FIG. 2.

Figure 4:
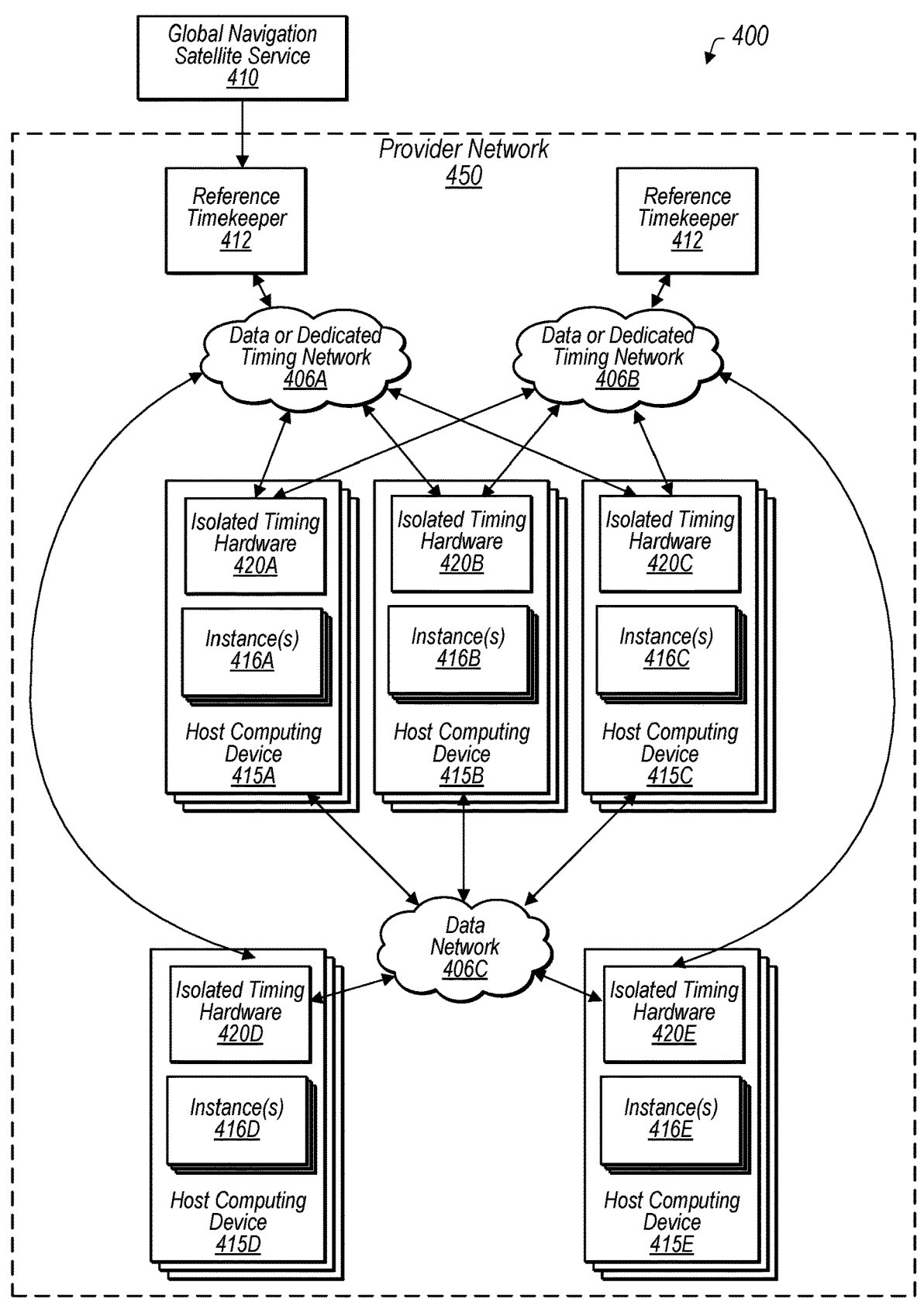
FIG. 4 depicts an example system environment including a provider network in which embodiments of the present disclosure can be implemented to provide highly accurate time information for time-stamping packets of hosted compute instances, wherein the highly accurate time information is provided using a dedicated timing network, according to some embodiments.

FIG. 4 depicts an example system environment including a provider network in which embodiments of the present disclosure can be implemented to provide highly accurate time information for time-stamping packets of hosted compute instances 416, by the use of a timing information received from a data or dedicated timing network (406A & 406B), according to some embodiments. The provider network 450 can be accessed by user computing devices over a network (not shown). A provider network 450 (sometimes referred to simply as a "cloud"), refers to a pool of network-accessible computing resources (such as compute, storage, and networking resources, applications, and services), which may be virtualized or bare-metal. The provider network can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in provider network data centers that provide those services.

The provider network 450 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the provider network, in contrast to resources requested by users of the provider network, which may be provisioned in user accounts.

In FIG. 4, the provider network 450 includes sets of host computing devices 415, labeled as set 415A, 415B, 415C, 415D, and 415E in FIG. 4. Each set can represent a logical group of devices 415, such as a physical "rack" of devices. Each device can support one or more hosted machine instances 416A-E. Host machine instances 416 may be virtual machine instances, representing virtualized hardware (supported by underlying hardware of the devices 415) supporting, e.g., an operating system and applications. Hosted compute instances 416 may further represent "bare metal" instances, whereby a portion of the computing resources of the device 415 directly support (without virtualization) the instance 416. In some cases, an instance 416 may be created and maintained on behalf of a user. For example, a user may utilize a user computing device to request creation of an instance 416 executing user-defined software. In other cases, instances 416 may implement functionality of the provider network 450 itself. For example, instances 416 may correspond to block storage servers, object storage servers, or compute servers that in term provide block storage, object storage, or compute, respectively, to user computing devices 402. Each host computing device 415 includes hardware computer memory and/or processors, an operating system that provides executable program instructions for the general administration and operation of that server, and a computer-readable medium storing instructions that, when executed by a processor of the server, allow the server to perform its intended functions. While not shown in FIG. 4, the provider network 450 may include other computing devices facilitating operation of the host computing devices 415, such as data stores to store account information, computing devices to implement logging, monitoring, and billing services, etc.

The provider network 450 can provide on-demand, scalable computing platforms to users through the network 404, for example allowing users to have at their disposal scalable "virtual computing devices" via their use instances 416 or services provided by such instances 416. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users.

The provider network 450 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the provider network. Preferably, availability zones within a region are positioned far enough away from one other that the same natural disaster should not take more than one availability zone offline at the same time. Users can connect to availability zones of the provider network via a publicly accessible network (e.g., the Internet, a cellular communication network) by way of a transit center (TC). TCs are the primary backbone locations linking users to the provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The provider network may deliver content from points of presence outside of, but networked with, these regions by way of edge locations, regional edge cache servers. This compartmentalization and geographic distribution of computing hardware enables the provider network to provide low-latency resource access to users on a global scale with a high degree of fault tolerance and stability. In some implementations, the provider network can include one or more cellular networks managed and provided by the cloud provider. The elements shown in FIG. 4 illustratively represent a collection of elements present in a single region or availability zone. These elements may thus be replicated in each such region or availability zone.

Although not illustrated in FIG. 4, instances 416 can communicate over a network with user computing devices. The network can include any appropriate network, including an intranet, the Internet, a cellular network, a local area network or any other such network or combination thereof. The network can illustratively be a general-purpose communication network, such as the Internet. Accordingly, the network may contain packetized information enabling arbitrary data exchange between networked devices. Protocols and components for communicating via the Internet or any of the other aforementioned types of communication networks are known to those skilled in the art of computer communications and thus, need not be described in more detail herein.

User computing devices can include any network-equipped computing device, for example desktop computers, laptops, smartphones, tablets, e-readers, gaming consoles, and the like. Users can access the provider network 450 via the network to view or manage their data and computing resources, as well as to use websites and/or applications hosted by the provider network 450. Elements of the provider network 450 may also act as users to other elements of that network 450. Thus, a user device can generally refer to any device accessing a network-accessible service as a user of that service.

Users can have a way to opt-in to the timestamp services of the provider network, in some embodiments. For example, users can set a flag to expose or to not expose the timestamp information of packets that are received. Also the users may opt into including or not including timestamps in packets sent from the user's compute instance(s). This opt-in can be an attribute of the compute instances 416 that are set by the users. In some embodiments, users can be charged for the timestamp service, either for the whole service or per timestamp, depending on the embodiment.

In addition to the network, the host computing devices 415 can be connected to internal data or dedicated timing networks, denoted as networks 406A, 406B. These internal networks can carry data as well as time information. In some embodiments, one of the internal networks is a dedicated time network that only carries timing information. The internal data and/or dedicated time networks 406A-B can be further connected to one or more reference timekeepers 412, which act as a point of reference for time information delivered via the network. For example, each reference timekeeper 412 may be an atomic clock or a GNSS 410 receiver, and may thus act as a source of highly accurate time information for devices 415 within the network 406. In one embodiment, each different reference timekeeper 412 is synchronized to one another, and therefore shares to a high degree of accuracy a common time. For example, each timekeeper 412 may be synchronized to a common GNSS, such as GPS, with a high degree of accuracy (e.g., tens of nanoseconds).

The internal data and/or dedicated time network can include an interconnected set of devices configured to carry time information from the reference timekeeper 412 to the host computing devices 415 with minimal loss in accuracy (e.g., on the order of nanoseconds). For example, the networks 406 may include devices configured to the specifications of the White Rabbit Project, a known project to develop highly accurate timing networks. In some implementations, the data and/or dedicated time distribution network can be coupled between the GNSS receivers and every top of rack switch ("TOR") in a datacenter. To avoid issues of congestion or contention for network resources, each network 406 may be dedicated to time information, and provide such time information with little or no encoding. In other embodiments, the time information can traverse the normal data network of the provider network. In some embodiments the data network and a dedicated time network may utilize a common but electrically partitioned physical substrate. For example, cabling between the elements of FIG. 4 may include both wiring for the network and distinct wiring for the dedicated time network. The respective wirings can be electrically isolated from one another such that signals traversing the network do not inhibit signals traversing the dedicated time network. In other embodiments, the time signals traverse the same network as the data signals. The depicted timekeepers 412 and the internal networks 406 can be used to provide a time synchronization service provided by the isolated timing hardware 420. Such a service may be made available to isolated timing hardware 420A-420E.

Illustratively, each network (406A & 406B) may carry exclusively a fixed signal, such as a fixed-width pulse (e.g., a pulse-per-second, or PPS, signal or other signal of fixed width, including a fixed frequency signal) that is broadcast from a single reference timekeeper 412 to downstream devices. In one embodiment, the time information indicates time passage, without a point of reference for the present time. For example, the time information may indicate the passing of each second, but not which second is passing. In embodiments in which multiple timekeepers 412 exist within an internal network 406, devices on the network, such as timing switches, may operate to select a single upstream signal from a single timekeeper 412 to use as a source of time information to propagate to downstream devices, such as host devices 415. In some embodiments, the switches may select a signal based on metadata related to the signals, as discussed in more detail below. Moreover, switches or other devices within the internal network 406 may utilize other techniques to account for potential inaccuracies in the network 406. For example, the switches or other devices may account for latency on the network 406 due to physical distance between devices, such as by adjusting received time information based on expected latency (e.g., calculated based on known cable length, based on measured round trip communication time, etc.). Because the networks 406 may be dedicated to carrying time information from the reference timekeepers 412, the isolated timing hardware 420 of the host computing devices 415 may be configured to act purely as consumers of information on the networks 406, and be unable to transmit information on the networks 406.

In addition to connection to internal networks 406, reference timekeepers 412 may additionally connect to the general-purpose communication network. Illustratively, connection to the network may facilitate collection of metadata regarding operation of the reference timekeepers 412, as discussed below. Moreover, in some embodiments the network is utilized to provide a reference time from reference timekeepers 412 to isolated timing hardware 420 of host computing devices 415, which reference time indicates the present time. For example, where the internal network 406 indicates the occurrence of a second marker, but not which second has occurred, isolated timing hardware 420 of host computing devices 415 may require a reference point to determine which second has occurred. This reference point need not share the same accuracy as time information provided by the internal network 406, as a reference time may be offset by plus or minus half the period of the time information. For example, if the reference time is early by four tenths of a second, an isolated timing hardware 420 of host computing device 415 may receive the reference time and adjust the reference time to the nearest second marker as indicated by the time information of the internal network 406, thus achieving time synchronization to the accuracy of the time information. In one embodiment, a reference time is transmitted over the network 404 according to a known timing protocol, such as NTP. While such protocols may not be sufficiently accurate to independently synchronize time, they may be sufficiently accurate to provide a reference time in accordance with embodiments of the present disclosure.

By utilizing a combination of a reference time (e.g., obtained via network 404) and time information obtained via a internal network 406, each instance of isolated timing hardware 420 of the host computing devices 415A through 415E may synchronize a local clock to that of a reference timekeeper 412. In accordance with embodiments of the present disclosure, that local clock time may then be used by timestamp creation component 140 to determine highly accurate times to include in attested time stamps. In one embodiment, each host computing device 415 includes isolated timing hardware 420 that is isolated from computing resources of the instances 416, which hardware is utilized to maintain a clock of the host computing device 415. For example, the isolated timing hardware 420 may be included in an "offload" card physically installed on the device 415, which card includes separate computing resources (e.g., a distinct processor, distinct memory, etc.) from those resources used by the instances 416, where such separate computing resources can be dedicated to instance management tasks such as virtual machine management, input/output virtualization to network-attached storage volumes, local migration management tasks, instance health monitoring, and the disclosed host clock or virtualized hardware clock, along with attested time stamping. In one embodiment, the card is connected to the resources used by instances 416 via a Peripheral Component Interconnect Express (PCIe) bus of the host computing device 415. Thus, the instances 416, executing on their distinct computing resources, may communicate with the card (or other networking computing resources, such as isolated timing hardware 420) via local interfaces of the device 415, without traversing a network. Moreover, because such hardware 420 can be isolated from that of instances 416, issues such as resource contention, which may otherwise inhibit accurate timekeeping, can be avoided.

In accordance with embodiments of the present disclosure, isolated hardware of the host computing devices 415 may operate as a stratum 1 server, or other isolated timing hardware 420 (shown in FIG. 4 as isolated timing hardware 420A-E) for instances 416. In the parlance of certain network time protocols, "stratums" indicate distance from a reference clock. For example, "stratum 0" may indicate the reference clock, and "stratum 1" may indicate a device directly linked to the reference clock. Stratum 2 may indicate a device linked to a stratum 1 device over a network path. In FIG. 4, each host device 415 obtains time information over an internal network 406 (such as a data or dedicated time network) from a reference timekeeper 412 (e.g., a stratum 0 device). This enables the internal network 406A & 406B to act as a "direct link" to the reference timekeeper 412, such that time information need not flow over a general communication network (e.g., network 404). Accordingly, each host computing device 415 effectively operates as a stratum 1 server. Moreover, because isolated timing hardware 420 are co-located on a host computing device 415, time stamp creation components (as shown in FIG. 1) may not ever traverse the network 404 to obtain time information. Accordingly, each time stamp creation component 130 is enabled to synchronize to a reference timekeeper with a very high accuracy.

Each of the host computing devices 415A-E can operate as a sending host computing device of FIG. 1, or a receiving host computing device of FIG. 2 or FIG. 3. The host computing devices can send and receive packets from one another through the internal data network 406C. For example, a compute instance 416D of host computing device 415D might send a packet to a destination compute instance 416B of host computing device 415B. In such a scenario, the isolated timing hardware 420D of host computing device 415D would receive the packet from the sending compute instance 416D, and would operate in accordance with the functionality described in FIGS. 1, 2, and/or 3. A timestamp would be added to the packet by the isolated timing hardware 420D (or sent as a different packet), where the timestamp information can be placed in accordance to one of the different options described in FIGS. 5A-5D. The packet would be sent to the destination host computing device 415B. The destination host computing device 415B device would operate in accordance with the functionality described in FIG. 2 or FIG. 3. The isolated timing hardware 420B of the destination host computing device 415B might receive the packet first, and might extract and/or verify the timestamp and provide that information to the destination compute instance 416B, in some embodiments.

FIGS. 5A-5D illustrates different options for packaging a packet and a timestamp in order to provide the packet and the timestamp to a data network to transmit to the packet destination, according to some embodiments. For example, FIG. 5A illustrates a previous packet 510, that includes a header 517 and a body 519, where the header includes different kinds of information including a packet destination 512. FIG. 5A illustrates appending the timestamp 514 to the packet to create a modified or new packet 515 larger in size than the original packet 510. While the figure shows appending the timestamp 514 to the body of the previous packet 519, the timestamp 514 can also be appended to either header 517 or the body 519 of the previous packet, and can be placed either before or after the header 517, or before or after the body 519 of the previous packet, in order to create the new packet 515. This new or modified packet 515 is then provided to a data network to transmit to the packet destination.

FIG. 5B illustrates overwriting bits of the packet with the timestamp. FIG. 5B illustrates a packet 520 that includes a header 527 and a body 529, where the header includes different kinds of information including a packet destination 522. The packet 520 can also include bits 524 for a timestamp to be written to. FIG. 5B illustrates writing the new timestamp 526 to bits of the packet 524 to create a modified packet 520, wherein the modified packet is the same size as the original packet. While FIG. 5B shows the timestamp bits location 524 in the body of the packet 529, the bits of the packet for the timestamp 524 can be located in either the header 527 or the body 529 of the packet. For example, a timestamp can be embedded into the header of the packet 527, and it can then be overwritten by the isolated timing hardware of the host computing device on transmission. The new or modified packet 520 is transmitted to a data network to transmit to the packet destination.

FIG. 5C illustrates creating a separate packet with the timestamp that is also sent to the packet destination. FIG. 5C illustrates a data packet 530 that includes a header 537 and a body 539, where the header includes different kinds of information including a packet destination 522. FIG. 5C illustrates creating a separate packet 540 comprising the timestamp 544, the same packet destination 547 as the data packet destination 532, and information linking 546 the created separate timestamp packet 540 to the data packet 530. The packet and the created separate packet are provided to a data network to transmit to the packet destination. Complexity is introduced at the receiver in these embodiments in order to associate the two packets together and to rebuild the association between the data packet 530, and the timestamp 544 that is matching the data packet 530 in the timestamp packet 540.

FIG. 5D illustrates encapsulating the packet 550 and the timestamp 564 according to a tunneling protocol, and providing the encapsulated packet 560 to the packet destination. FIG. 5D illustrates a data packet 550 that includes a header and a body, where the header includes different kinds of information including a packet destination 552. FIG. 5D illustrates encapsulating the packet 550 into an encapsulated packet 560 according to a tunneling protocol, wherein the encapsulated packet comprises the timestamp 564. In some embodiments, the encapsulated packet 560 can also include a destination 562 that is the same destination as the encapsulated packet 550. The encapsulated packet 560 comprising the packet 550 and the timestamp 564 is provided to a data network to transmit to the packet destination. The packet 550 can be encapsulated as part of a tunneling protocol, in some embodiments. In some of these embodiments, the encapsulated packet can be transmitted in a dedicated and/or new tunnel in accordance with the tunneling protocol. In some other of these embodiments, the tunneling protocol is an existing virtual network protocol that is already used between instances and/or host computing devices of a provider network, for example.

FIG. 6 is a flowchart of an illustrative method that can implement trusted packet time-stamping, where a networking computing resource receives a packet from a particular compute instance, creates a timestamp for the packet based its hardware clock, where the timestamp is outside the control of the particular compute instance, and provides the packet and the timestamp to a data network to transmit to the packet destination. The method begins at block 610 where a networking computing resource, such as isolated timing hardware, receives a packet from a particular compute instance, where the packet has a packet destination, where the networking computing resource utilizes a first set of computing resources, and where a host computing device that hosts the compute instance utilizes a second set of computing resources. The flowchart then transitions to block 620 in which the networking computing resource creates a timestamp for the packet based its hardware clock, where the timestamp is outside the control of the particular compute instance. Finally, the flowchart transitions to block 630 in which the networking computing resource provides the packet and the timestamp to a data network to transmit to the packet destination.

FIG. 7 is a flowchart further illustrating example methods that can implement trusted packet time-stamping, where a networking computing resource receives a packet from a particular compute instance, creates a timestamp for the packet based its hardware clock, where the timestamp is outside the control of the particular compute instance, and then performs one of four different options for packaging the packet and the timestamp in order to provide the packet and the timestamp to a data network to transmit to the packet destination. The flowchart begins at block 710 in which a networking computing resource receives a packet from a particular compute instance, where the packet has a packet destination, where the networking computing resource utilizes a first set of computing resources, and where a host computing device that hosts the compute instance utilizes a second set of computing resources. The flowchart then transitions to block 720 where the networking computing resource creates a timestamp for the packet based its hardware clock, where the timestamp is outside the control of the particular compute instance.

The flowchart then transitions to 1 of 4 different paths depending on the embodiment, to perform 1 of 4 different options for packaging the packet and the timestamp in order to provide the packet and the timestamp to a data network to transmit to the packet destination. Any given embodiment might only be capable of performing the functionality of 1 of these 4 paths, and this flowchart should not be interpreted as requiring any given embodiment to be able to perform, or to perform, all 4 of these different paths. For the first path, the flowchart transitions to block 730, in which the networking computing resource appends the timestamp to the packet to create a modified packet larger in size than the packet. Then, at block 735, the networking computing resource provides the modified packet to the data network to transmit to the packet destination. For second path, the flowchart transitions to block 740 in which the networking computing resource overwrites bits of the packet with the timestamp to create a modified packet that is the same size as the packet. Then, at block 745 the networking computing resource provides the modified packet to the data network to transmit to the packet destination.

For the third path, the flowchart transitions to block 750 where the networking computing resource creates a separate packet comprising the timestamp, the same packet destination as the packet, and information linking the created separate packet to the packet. For this path, the flowchart then transitions to block 755 where the networking computing resource provides the packet and the created separate packet to the data network to transmit to the packet destination. For the fourth path, the flowchart first transitions to block 760 in which a network tunnel is created to the packet destination using a tunneling protocol. Then, at block 762 the networking computing resource encapsulates the packet into an encapsulated packet according to the tunneling protocol, wherein the encapsulated packet comprises the timestamp. Finally, for this fourth path, the flowchart transitions to block 765 in which the networking computing resource provides the encapsulated packet to the data network to transmit to the packet destination via the network tunnel.

FIG. 8A is a flowchart of an illustrative method that can implement trusted packet time-stamping, where a networking computing resource receives a packet from a particular compute instance, creates a timestamp for the packet based on its hardware clock where the timestamp is outside the control of the particular compute instance, determines a packet latency for the second packet based at least in part on the sent timestamp and the received timestamp, and sends the second packet (and possibly the packet latency) to the destination compute instance, and where the method further performs network analysis using the packet latency. The flowchart begins at block 810 where a networking computing resource receives a packet from a source other than a host computing device, where the packet comprises a sent timestamp, where the destination of the second packet is a destination compute instance of the host computing device, where the networking computing resource utilizes a first set of computing resources, and where the host computing device that hosts the compute instance utilizes a second set of computing resources. The flowchart transitions to block 820 where the networking computing resource determines that the sent timestamp is trusted (e.g., was created by a second isolated timing hardware of the second host computing device, and/or outside the control of a sending compute instance). Then at block 830, the networking computing resource provides the second packet and information regarding the determination that the sent timestamp is trusted to the destination compute instance.

FIG. 8B is a flowchart of an illustrative method that can implement trusted packet time-stamping, where a networking computing resource receives a packet from a particular compute instance, creates a timestamp for the packet based its hardware clock where the timestamp is outside the control of the particular compute instance, determines a packet latency for the second packet based at least in part on the sent timestamp and the received timestamp, and sends the second packet (and possibly the packet latency) to the destination compute instance, and where the method further performs network analysis using the packet latency. The flowchart begins at block 840 where a networking computing resource receives a packet from a source other than a host computing device, where the packet comprises a sent timestamp, where the destination of the second packet is a destination compute instance of the host computing device, where the networking computing resource utilizes a first set of computing resources, and where the host computing device that hosts the compute instance utilizes a second set of computing resources. The flowchart transitions to block 850 where the networking computing resource creates a received timestamp for the second packet based at least in part on a hardware clock of the networking computing resource, wherein the received timestamp is outside the control of the destination compute instance. Then at block 860, the networking computing resource determines a packet latency for the second packet based at least in part on the sent timestamp and the received timestamp. At block 870, the networking computing resource sends the second packet (and possibly the packet latency) to the destination compute instance. Finally, the flowchart transitions to block 880 in which the packet latency is used to perform a network analysis. The network analysis can include, for example, determining network health or load by measuring the near-exact transmission time of the packet from the sending host computing device to the receiver host computing device, without having the measurement inadvertently influenced by the load of the sending or receiving compute instance.

Figure 9:
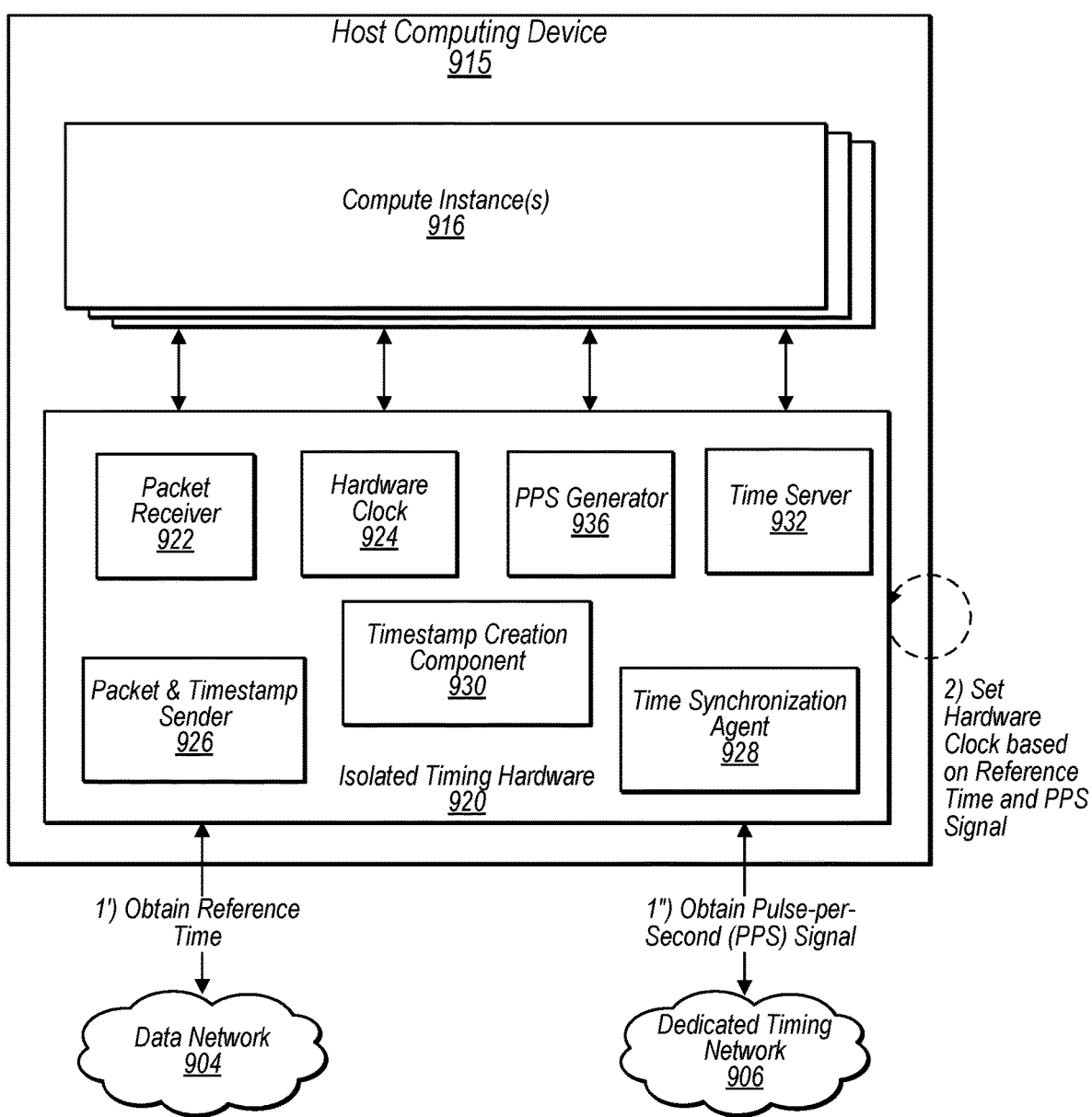
FIG. 9 depicts a logical model of a host computing device providing highly accurate time information for time-stamping packets of hosted compute instances, showing example interactions for synchronizing isolated timing hardware of a host computing device using a dedicated time network option of FIG. 3, and illustrating components for synchronizing system clocks of hosted compute instances with a clock of the isolated timing hardware.

FIG. 9 depicts a logical model of a host computing device providing highly accurate time information for time-stamping packets of hosted compute instances, showing example interactions for synchronizing isolated timing hardware of a host computing device using a dedicated time network of FIG. 4. As shown in FIG. 9, a host computing device 915 can include isolated timing hardware 920, which may operate for example as a stratum 1 server. The isolated timing hardware 920 of FIG. 9, includes the same components as shown in FIG. 1 as well as some additional components. The same components are the time synchronization agent 928, the hardware clock 924, the timestamp creation component 930, the packet receiver 922, and the packet and timestamp sender 926. The additional components include the time server 932 and the PPS generator 936.

The isolated timing hardware 920 can include a hardware clock 924 (e.g., an oscillator) that can be synchronized to a reference timekeeper 312 by a synchronization agent 928 based on a reference time provided by the network 904 and time information provided by the dedicated time network 906. For example, the agent 928 may consume a PPS signal from the dedicated time network 906 in order to establish second boundaries, and synchronize the hardware clock 924 to such second boundaries. The agent 928 may further periodically (e.g., every 16-32 seconds) obtain a reference time from the network 904 (e.g., according to the NTP protocol) to ensure that the clock 924 is aligned to the correct second, as indicated by the reference time. In one embodiment, the hardware clock 924 is a PTP hardware clock (PHC), which may for example be embedded within a network interface card (NIC) interfacing with the dedicated time network 906. Thus, synchronization of the hardware clock 924 may occur within hardware of the NIC, resulting in highly accurate synchronization.

With respect to acquisition of time information via a network-based time protocol, the isolated timing hardware 920 may implement a time server 922 acting as a server for the network-based time protocol. An instance 916 may thus query for and obtain a time of the hardware clock 924 via the time server 922 according to that network time protocol. In one embodiment, such communications occur internally to the device 915, and thus never traverse the network 904. For example, a network interface of the host computing device 915 may exist within the isolated timing hardware 920 (e.g., within an offload card providing such hardware 920), and the host computing device 915 may provide a virtualized network device via that hardware 920. Accordingly, network communications from the instance 916 may traverse the isolated timing hardware 920 prior to transmission on the network 904. In the case of queries to the time server 922, the isolated timing hardware 920 may intercept such transmission and provide a response, thus foregoing transmission on the network 904. In this manner, the instance 916 is enabled to utilize a network protocol to synchronize time without incurring the typical decrease in accuracy that occurs when the network protocol is implemented on a physical substrate network.

Furthermore, in FIG. 9, a host computing device 915 includes isolated timing hardware (e.g., as part of an offload card) with a hardware clock 924. Further, the hardware clock 924 is first synchronized to a reference timekeeper 412, thus enabling the hardware clock 924 to act as a "stratum 1" time source. The interactions for synchronizing a hardware clock 924 to the reference timekeepers 412 are the following. Specifically, these interactions begin at (1') and (1"), where the isolated timing hardware 920 obtains a reference time from the network 904 and a PPS signal from the dedicated time network 906. In one embodiment, the reference time is obtained based on a request transmitted to a remote device via a network-based time protocol, such as NTP or PTP. For example, a reference timekeeper 412 may act as an NTP or PTP server via the network 904. The reference time may indicate a current time, such as the current date, hour, minute, second, etc. For example, the reference time may be provided as a coordinated universal time (UTC) value, a Unix time value, or the like. In contrast, the PPS signal may lack a reference point, and instead indicate an alignment of seconds (analogous to the "ticking" of an analog clock). For example, the PPS may be generated by a top-of-rack switch based on a signal from the reference timekeeper 412 as passed through a dedicated time network 906. However, the PPS signal may be highly accurate relative to the reference time. As such, the PPS signal may be combined with the reference time to determine a present time. Accordingly, at (2), the isolated timing hardware 920 sets a time of the hardware clock 924 based on the reference time and PPS signal.

While FIG. 9 discusses a PPS signal, other fixed-width signals (such as a pulse per half-second, pulse per quarter second, etc.) may be used. In addition to the interactions described above, the isolated timing hardware 920 may implement additional functionalities. For example, where multiple PPS signals are provided (such as via two or more dedicated time networks 906), the isolated timing hardware 920 may be configured to select among the PPS signals based on expected accuracy. Illustratively, where three or more signals are provided, the hardware 920 may identify a "quorum" time by identifying an outlier signal and selecting a PPS signal from remaining signals. In some cases, the hardware 920 may communicate with the timing metadata system 1006 of FIG. 10 to obtain metadata regarding each signal, and may select from such signals based on metadata. For example, where the timing metadata system 906 has collected metadata indicating that a device providing a first signal is experiencing inaccuracies, the hardware 920 may select an alternative signal. In addition, the hardware 920 may in some cases use information from the timing metadata system 1006 to calibrate the hardware clock 924. For example, the hardware 920 may obtain a drift curve indicating drive of the clock 924 relative to temperature, and adjust timing of the clock 924 based on the drive curve and a current temperature of the hardware 920.

Figure 10:
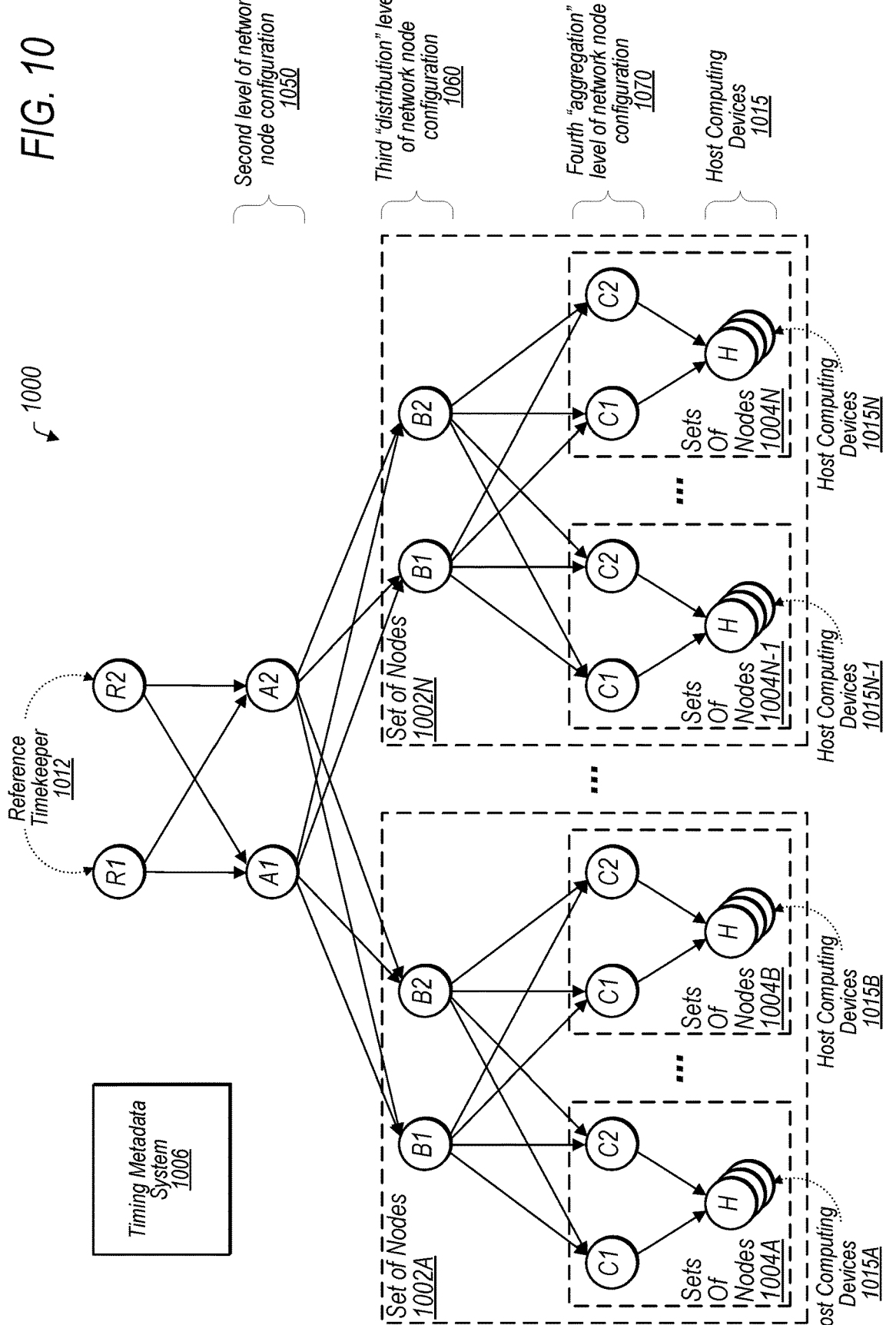
FIG. 10 depicts an example topology of a dedicated time network, such as shown as an option in FIG. 4, according to some embodiments.

With reference to FIG. 10, one example configuration 1000 of a dedicated time network (106 in FIG. 1, dedicated time network 206 in FIG. 2, dedicated time network 306 in FIG. 3, or dedicated time networks 406A-B in FIG. 4) will be described, which configuration may represent, for example a single dedicated time network (106 in FIG. 1, 406A-B in FIG. 4, etc.) within a data center within the provider network 450. The configuration 1000 is shown in FIG. 10 as a directed acyclic graph (DAG), with information flowing from reference timekeepers (412 shown in FIG. 4) as nodes R1 and R2 in FIG. 10 (1012), through the network 406 (comprising the second, third, and fourth levels of network node configuration—1050, 1060, & 1070) and to host computing devices (415A-E in FIG. 4), shown in FIG. 10 as nodes H (1015A, 1015B, 1015N-1, & 1015N). The configuration 1000 thus includes network devices, such as switches, that connect nodes R1 and R2 to nodes H. Illustratively, the configuration includes at least two duplicated nodes at each level for redundancy and resiliency. For example, a second level of the configuration 1050 includes nodes A1 and A2, which in turn communicate with a third level of the configuration 1060 designated as nodes B1 and B2. At the third level (which may be referred to as a "distribution" level), nodes are logically grouped into sets 1002, each including a node B1 and B2. FIG. 10 shows two such sets 1002, set 1002A and 1002N. However, the configuration may include any number of sets 1000. Similarly, at the fourth level 1070 (which may be referred to as an "aggregation" level), nodes are logically grouped into level 4 sets 1004, denoted in FIG. 10 as level 4 sets 1004A-N. Each level 4 set 1004 includes two network nodes C1 and C2 that provide time information from the dedicated time network (106 in FIG. 1, 406A-B in FIG. 4, etc.) to a logical grouping of host computing devices 1015, shown as nodes H. This logical grouping may represent, for example, a physical rack of such devices. Illustratively, a rack may include a "top of rack" switch that is configured to obtain time information from nodes C1 and C2, and to select time information from one of these nodes to pass onto host computing devices 1015 within the rack. Each level three set 1002 can include any number of level 4 sets 1004. Accordingly, the configuration 1000 enables the two reference timekeepers 1012 represented by nodes R1 and R2 to be shared among a large number of host computing devices 1015.

As noted above, each layer of the configuration 1000 may include redundant devices. While FIG. 10 shows two redundant devices, three or more devices are possible. This redundancy can ensure continued operation of the dedicated time network (106 in FIG. 1, 406 in FIG. 4, etc.) even if cases of failure of a device. While total failure is possible, one problematic situation in the context of time information is a partial failure of a device, whereby the device fails to provide time information with a desired accuracy. For example, an issue with a device or with an interconnect between devices may cause a signal to be delayed. For general communication networks, such delays may be expected and tolerated. However, for time information, such delays can significantly impact synchronization. Accordingly, embodiments of the present disclosure may include within a configuration 1000 a timing metadata system 1006 configured to analyze metadata regarding operation of devices (e.g., nodes in the configuration 1000) to detect potential delays in operation, and in some cases to attribute such delays to particular nodes or edges within the configuration 1000.

More specifically, the timing metadata system 1006 may obtain metadata from each device in the configuration 1000 (e.g., each node, including switches in each of the switching levels of the network node configuration (1050, 1060, & 1070), as well as host computing devices 1015) regarding time information received over the network 406. In one embodiment, this metadata reflects jitter in a signal transmitted over the network 406, as measured relative to an internal clock (e.g., a crystal oscillator) of the measuring device. For example, each reference timekeeper 1012 may be configured to provide a PPS signal, with an edge aligned to each second. A receiving device (e.g., node A1 in the second-level 1050) may determine the duration between second-aligned edges to determine, e.g., that more or less than a second has elapsed according to its internal clock. Jitter represents the variation in this period, and in general more jitter indicates a higher inaccuracy with respect to time information. However, because jitter compares an internal clock to a network signal, it may not be possible to determine the source of such inaccuracy—that is, jitter may occur due to variance in a devices internal clock, variance in the network signal, or both.

By collecting metadata from multiple points within the network, the timing metadata system 1006 may at least partially disambiguate inaccuracies to determine their source. For example, in the configuration 1000, both nodes B1 and B2 in the third-level 1060 receive a signal from node A1. An increase in jitter (with respect to the signal from A1)

at both nodes B1 and B2 can indicate an issue with operation of A1. An increase in jitter (with respect to the signal from A1) at B1 without a corresponding increase in jitter at B2 can indicate an issue with respect to node B1 or the connection between B1 and A1, rather than with respect to A1 itself. Similarly, B1 is connected to both A1 and A2. If the jitter at B2 increases with respect to the signal of A1 but not with respect to the signal of A2, this can indicate an issue with the connection between B1 and A1 (or, alternatively an issue with A1, which may be ruled out using the logic above). Alternatively, if the jitter at B2 increases with respect to signals of both A1 and A2, this can indicate an issue with B2 (or, alternatively an issue with both A1 and A2, which may be ruled out using the logic above). Accordingly, the timing metadata system 1006 may make pair-wise comparisons of timing metadata between various nodes at a given level of the configuration 1000 to identify particular nodes or edges that are experiencing low-accuracy operation.

While jitter is provided as one example of metadata regarding low-accuracy operation of nodes within the network 406, other types of metadata are possible. For example, in the instance that a node within in the network fails, downstream nodes may continue to retransmit time information further downstream to avoid cascading failure. Illustratively, if node A1 ceases to receive a signal from nodes R1 and R2, node A1 may nevertheless continue to transmit time information downstream to each node B1 and B2, such as by generating a PPS signal based on an internal clock of node A1. Because such signal may be less accurate than a signal locked to a reference timekeeper device, the timing metadata system 1006 may collect metadata indicating that a signal of a given node has been decoupled from an upstream node, and may notify downstream nodes that the node A1 is therefore operating with low accuracy. Additionally, or alternatively, the node A1 may modify the signal generated by that node to indicate low accuracy, such as by modifying the signal transmitted downstream in a manner that indicates low accuracy information.

On detecting a node or edge experiencing low-accuracy operation, the timing metadata system 1006 may notify relevant downstream nodes (e.g., those connected to the node or edge). These downstream nodes, in turn, may be configured to select an alternative upstream source of time information. Thus, if node A1 for example is experiencing low-accuracy operation, each node B1 and B2 may be configured to pass on time information from node A2, allowing the time information from node A1 to be dropped. While not shown in FIG. 10, the timing metadata system 1006 may be in network communication with each node. For example, each node and the system 1006 may communicate via the network 404 of FIG. 4. Illustratively, the timing metadata system 1006 may be implemented as software executing within an instance 416.

As discussed above, another source of inaccuracy in time information is clock drift, whereby a crystal oscillator or other time source within a device operates at a varying frequency, leading to an internal clock of that device running at a variable rate. One known contributor to clock drift is temperature. However, the specific drift experienced by an oscillator at a given temperature may vary according to the particular oscillator in question. Manufacturers may specify such drift statistically, guaranteeing for example a drift within a certain range at a given temperature. Unfortunately, these statistical measures are typically not accurate enough to conduct calibration with respect to an individual oscillator.

Embodiments of the present disclosure can address this problem by providing for device-specific drift measurements. In particular, the metadata collected by the timing metadata system 1006 may be utilized to calculate drift measurements relative to temperature on a per-device basis. As noted above, each device may periodically report to the timing metadata system 1006 metadata regarding time information obtained over the network. In one embodiment, this metadata includes a delta metric, indicating a difference in the measured versus expected width of the PPS signal (e.g., the signal occurred nanoseconds before or after expected according to an internal clock). Clock drift may be expected to at least partially account for such a delta. For example, a device may report that a PPS signal occurs around 5 nanoseconds early at a low temperature, and around 5 nanoseconds late at a high temperature. Under these conditions, a drift of 10 nanoseconds can be calculated to occur between the two temperatures. In practice, such clear drift may be difficult to detect with perfect precision. However, statistical analysis may be applied to metadata of a device over a long period of time in order to predict a device-specific drift. For example, the timing metadata system 1006 may correlate delta with device temperature (as also reported by each device), such as by calculating an average delta as a function of temperature, e.g., while excluding outliers that result from a device experiencing low-accuracy operation. In some embodiments, drift information (e.g., a drift curve) may be returned from the system 1006 to respective devices and used to calibrate an internal clock. For example, a device may apply an offset to time information provided by internal clock, with the offset determined based on device temperature and the drift information. In this way, the accuracy of individual devices (and thus the network 406) is increased.

In some embodiments, the timing metadata system 1006 may further be configured to estimate an accuracy of time information for a given host computing device 1015. For example, the timing metadata system 1006 may obtain metadata regarding operation of each node and edge between a reference timekeeper 1012 and a host computing device 1015, and analyze the metadata to determine a current accuracy of each node and edge. Potentially inaccuracy bands may be summed among the path from the reference timekeeper 1012 and the host computing device 1015 to determine an effective accuracy band at the host computing device. For example, where two nodes divide the reference timekeeper 1012 and the host computing device 1015, with a first node having an accuracy of plus or minus 2 microseconds relative to the reference timekeeper 1012 and a second node having an accuracy of plus or minus 3 microseconds relative to the first node, the expected accuracy of host computing device 1015 relative to the reference timekeeper 1012 may be 5 microseconds. In some embodiments, this information may be combined with an expected accuracy between isolated timing hardware 420 and an instance 416 in order to determine expected accuracy between the instance 416 and the reference timekeeper 1012. This expected accuracy may then be provided to the instance 416 as metadata regarding time information obtained from the isolated timing hardware 420. For example, when handling a request for a current time, the isolated timing hardware 420 may respond with the current time and metadata indicating the accuracy of that current time relative to the reference timekeeper 1012 (e.g., "it is Jan. 1, 2022, 00:00:00 UTC with an accuracy band of plus or minus 20 microseconds"). Accordingly, an instance 416 may obtain information indicating the expected accuracy of the time information.

Figure 11:
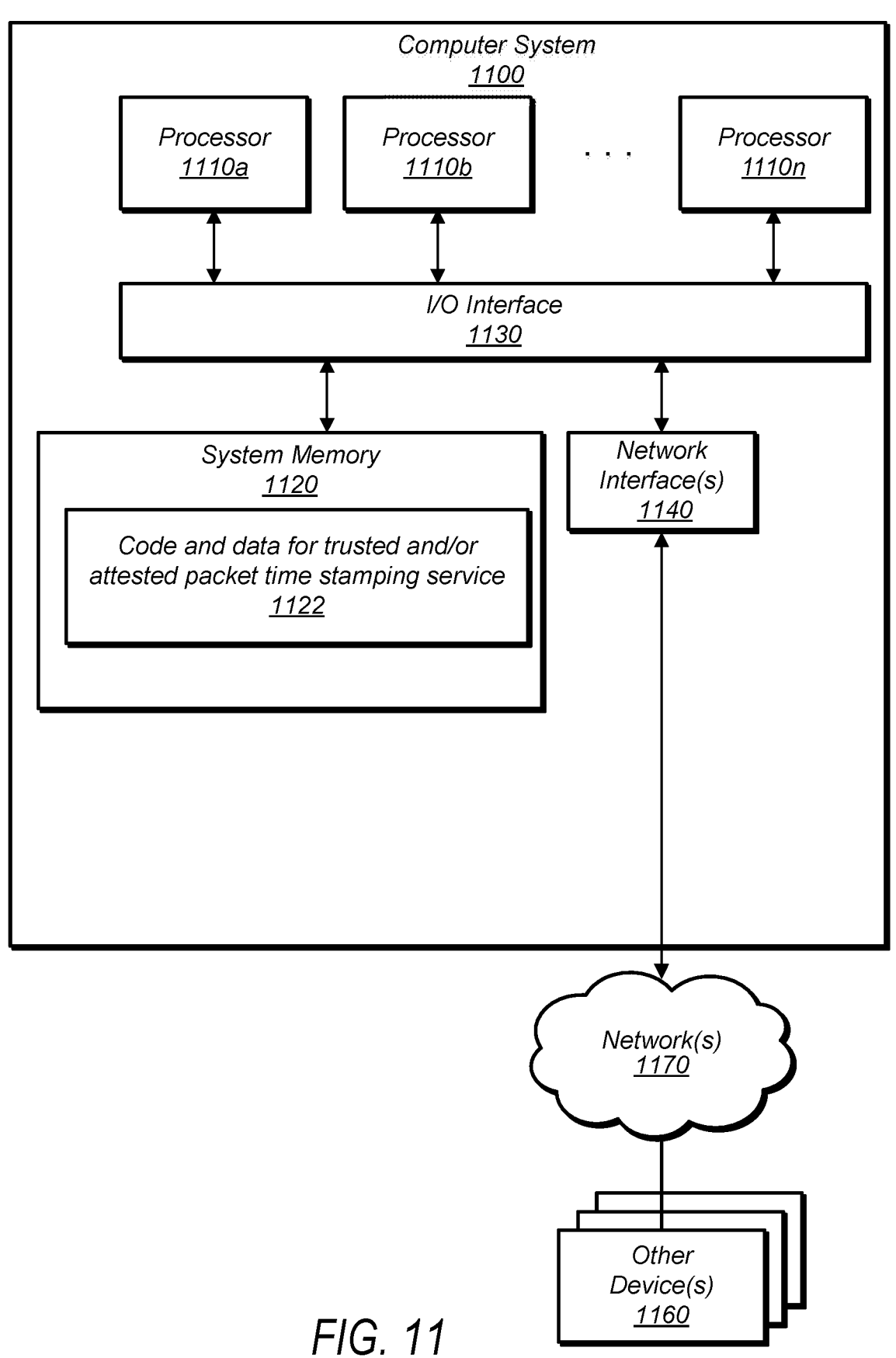
FIG. 11 is a block diagram illustrating an example computer system that may be used for trusted and/or attested packet time stamping service, according to some embodiments.

FIG. 11 is a block diagram illustrating an example computer system that may be used for providing highly accurate time information for time-stamping packets of hosted compute instances, according to some embodiments.

In at least some embodiments, a computer that implements a portion or all of the methods and apparatus for providing highly accurate time information for time-stamping packets of hosted compute instances as described herein may include a general-purpose computer system or computing device that includes or is configured to access one or more computer-accessible media, such as computer system 1100 illustrated in FIG. 11. FIG. 11 is a block diagram illustrating an example computer system that may be used in some embodiments. This computer system can be used for providing highly accurate time information for time-stamping packets of hosted compute instances, or for example as a host computing device (115, 215, 315, or 415A-E) that executes one or more of the plurality of compute instances (116, 216, 316, or 416A-E). In the illustrated embodiment, computer system 1100 includes one or more processors 1110 coupled to a system memory 1120 via an input/output (I/O) interface 1130. Computer system 1100 further includes a network interface 1140 coupled to I/O interface 1130.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing highly accurate time information for time-stamping packets of hosted compute instances, are shown stored within system memory 1120 as the code and data for a trusted and/or attested packet time stamping service 1122.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1170, such as other computer systems or devices as illustrated in FIGS. 1, 2, 3, 4, 9, and 10, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above for FIGS. 1 through 8 for providing highly accurate time information for time-stamping packets of hosted compute instances. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Any of various computer systems may be configured to implement processes associated with the provider network, the reference timekeepers, the nodes of the dedicated timing network, the host computing devices, or any other component of the above figures. In various embodiments, the provider network, the reference timekeepers, the nodes of the dedicated timing network, the host computing devices, or any other component of any of FIGS. 1-10 may each include one or more computer systems 1100 such as that illustrated in FIG. 11. In embodiments, provider network, the reference timekeepers, the nodes of the dedicated timing network, the host computing devices, or any other component may include one or more components of the computer system 1100 that function in a same or similar way as described for the computer system 1100.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a reference timekeeper providing a reference clock synchronized to a Global Navigation Satellite System (GNSS); and
   a plurality of host computing devices, wherein individual host computing devices comprise computing hardware resources to host one or more compute instances, and further comprise a separate isolated timing hardware; and
   wherein the separate isolated timing hardware of a particular host computing device of the plurality of host computing devices is configured to:
      set a hardware clock of the separate isolated timing hardware based on a signal corresponding to the reference clock obtained from the reference timekeeper via a dedicated time network inaccessible to the one or more compute instances hosted by the particular host computing device;
      receive a packet from a particular compute instance of the one or more compute instances hosted by the particular host computing device, wherein the packet comprises a packet destination;
      create a timestamp for the packet based on the hardware clock of the separate isolated timing hardware, wherein the timestamp is outside the control of the one or more compute instances, including the particular compute instance; and
      provide the packet and the timestamp to a data network distinct from the dedicated time network to transmit to the packet destination.

2. The system of claim 1, wherein the one or more compute instances comprise at least one of a virtual compute instance or a bare metal instance.

3. The system of claim 1, wherein the separate isolated timing hardware of the particular host computing device is further configured to:
   receive a second packet that was sent from a second host computing device of the plurality of host computing devices, wherein the second packet comprises a sent timestamp, and wherein the destination of the second packet is a destination compute instance of the one or more compute instances hosted by the particular host computing device;
   cryptographically certify that the sent timestamp was created by a second separate isolated timing hardware of the second host computing device; and
   provide the second packet and information regarding the certification to the destination compute instance.

4. The system of claim 1, wherein the separate isolated timing hardware of the particular host computing device is further configured to:
   encapsulate the packet into an encapsulated packet according to a tunneling protocol, wherein the encapsulated packet comprises the timestamp; and
   wherein to provide the packet and the timestamp to the data network to transmit to the packet destination further comprises:

provide the encapsulated packet comprising the packet and the timestamp to the data network to transmit to the packet destination.

5. A method, comprising:

receiving, at a networking hardware computing resource, wherein the networking hardware computing resource is coupled to a host computing device comprising separate computing hardware resources that host one or more compute instances, a packet from a particular compute instance of the one or more compute instances, wherein the packet comprises a packet destination;

creating, at the networking hardware computing resource, a timestamp for the packet based on a hardware clock of the networking hardware computing resource, wherein the timestamp is outside the control of the particular compute instance; and providing the packet and the timestamp to a data network for transmission to the packet destination.

6. The method as recited in claim 5, wherein the networking hardware computing resource comprises a network interface card in the host computing device.

7. The method as recited in claim 5, further comprising:

setting the hardware clock of the networking hardware computing resource based on a signal corresponding to a reference clock obtained from a reference timekeeper via a dedicated time network inaccessible to the one or more compute instances;

wherein the dedicated time network is distinct from the data network.

8. The method as recited in claim 7, wherein the reference clock provided by the reference timekeeper is synchronized to a Global Navigation Satellite System (GNSS), and wherein the hardware clock of the networking hardware computing resource is embedded within a network interface card (NIC) of the networking hardware computing resource.

9. The method as recited in claim 5, further comprising:

appending the timestamp to either the header or the body of the packet to create a modified packet larger in size than the packet; and wherein the providing the packet and the timestamp to the data network to transmit to the packet destination further comprises:

providing the modified packet to the data network to transmit to the packet destination.

10. The method as recited in claim 5, further comprising:

writing the timestamp to bits of the packet to create a modified packet, wherein the modified packet is the same size as the packet; and wherein the providing the packet and the timestamp to the data network to transmit to the packet destination further comprises:

providing the modified packet to the data network to transmit to the packet destination.

11. The method as recited in claim 5, further comprising:

creating a separate packet comprising the timestamp, the same packet destination as the packet, and information linking the created separate packet to the packet; and wherein the providing the packet and the timestamp to the data network to transmit to the packet destination further comprises:

providing the packet and the created separate packet to the data network to transmit to the packet destination.

12. The method as recited in claim 5, further comprising:

encapsulating the packet into an encapsulated packet according to a tunneling protocol, wherein the encapsulated packet comprises the timestamp; and wherein the providing the packet and the timestamp to the data network to transmit to the packet destination further comprises:

providing the encapsulated packet comprising the packet and the timestamp to the data network to transmit to the packet destination.

13. The method as recited in claim 5, further comprising:

receiving, at the networking hardware computing resource, a second packet from a source other than the host computing device, wherein the second packet comprises a sent timestamp, and wherein the destination of the second packet is a destination compute instance of the one or more compute instances of the host computing device;

determining that the sent timestamp was created outside the control of a sending compute instance; and providing the second packet and information regarding the determination that the sent timestamp was created outside the control of the sending compute instance to the destination compute instance.

14. One or more non-transitory computer-readable storage media storing program instructions, that when executed on or across one or more processors of a networking hardware computing resource, cause the one or more processors to:

receive at the networking hardware computing resource, wherein the networking hardware computing resource is coupled to a host computing device comprising separate computing hardware resources that host one or more compute instances, a packet that has left the control of a particular compute instance of the one or more compute instances, wherein the packet comprises a packet destination;

create, at the networking hardware computing resource, a timestamp for the packet based on a hardware clock of the networking hardware computing resource, wherein the timestamp is outside the control of the particular compute instance; and provide the packet and the timestamp to a data network for transmission to the packet destination.

15. The one or more non-transitory computer-readable storage media of claim 14, wherein the program instructions further cause the one or more processors of the networking hardware computing resource to:

set the hardware clock of the networking hardware computing resource based on a signal corresponding to a reference clock obtained from a reference timekeeper via a dedicated time network inaccessible to the one or more compute instances;

wherein the dedicated time network is distinct from the data network.

16. The one or more non-transitory computer-readable storage media of claim 14, wherein the program instructions further cause the one or more processors of the networking hardware computing resource to:

append the timestamp to either the header or the body of the packet to create a modified packet larger in size than the packet; and wherein the providing the packet and the timestamp to the data network to transmit to the packet destination further comprises:

provide the modified packet to the data network to transmit to the packet destination.

17. The one or more non-transitory computer-readable storage media of claim 14, wherein the program instructions further cause the one or more processors of the networking hardware computing resource to:

write the timestamp to bits of the packet to create a modified packet, wherein the modified packet is the same size as the packet; and wherein the providing the packet and the timestamp to the data network to transmit to the packet destination further comprises:

provide the modified packet to the data network to transmit to the packet destination.

18. The one or more non-transitory computer-readable storage media of claim 14, wherein the program instructions further cause the one or more processors of the networking hardware computing resource to:

create a separate packet comprising the timestamp, the same packet destination as the packet, and information linking the created separate packet to the packet; and wherein the providing the packet and the timestamp to the data network to transmit to the packet destination further comprises:

provide the packet and the created separate packet to the data network to transmit to the packet destination.

19. The one or more non-transitory computer-readable storage media of claim 14, wherein the program instructions further cause the one or more processors of the networking hardware computing resource to:

encapsulate the packet into an encapsulated packet according to a tunneling protocol, wherein the encapsulated packet comprises the timestamp; and wherein to provide the packet and the timestamp to the data network to transmit to the packet destination further comprises:

provide the encapsulated packet comprising the packet and the timestamp to the data network to transmit to the packet destination.

20. The one or more non-transitory computer-readable storage media of claim 14, wherein the program instructions further cause the one or more processors of the networking hardware computing resource to:

receive, at the networking hardware computing resource, a second packet from a source other than the host computing device, wherein the second packet comprises a sent timestamp, and wherein the destination of the second packet is a destination compute instance of the one or more compute instances of the host computing device, determine that the sent timestamp was created outside the control of a sending compute instance; and provide the second packet and information regarding the determination that the sent timestamp was created outside the control of the sending compute instance to the destination compute instance.

\* \* \* \* \*